(12) United States Patent
Yoo et al.

(10) Patent No.: US 11,559,176 B2
(45) Date of Patent: Jan. 24, 2023

(54) DRYER STAND

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 668 days.

(21) Appl. No.: 16/576,359

(22) Filed: Sep. 19, 2019

(65) Prior Publication Data

US 2020/0085254 A1 Mar. 19, 2020

Related U.S. Application Data

(60) Provisional application No. 62/733,478, filed on Sep. 19, 2018.

(30) Foreign Application Priority Data

Feb. 22, 2019 (KR) .................. 10-2019-0021182
Feb. 22, 2019 (KR) .................. 10-2019-0021184

(51) Int. Cl.
*A47K 10/48* (2006.01)

(52) U.S. Cl.
CPC .................. *A47K 10/48* (2013.01)

(58) Field of Classification Search
CPC ......... A47K 10/48; A45D 20/12; A45D 20/14
USPC ...................................... 34/95–100
See application file for complete search history.

(56) References Cited

U.S. PATENT DOCUMENTS

| 3,786,575 | A | * | 1/1974 | Riblett | F21S 8/061 |
| | | | | | 34/88 |
| 4,195,416 | A | * | 4/1980 | Hall | A47K 10/48 |
| | | | | | 34/233 |
| 4,242,810 | A | * | 1/1981 | Blanco | A45D 20/16 |
| | | | | | 34/88 |
| 5,103,577 | A | * | 4/1992 | Michaels | A47K 10/48 |
| | | | | | 34/91 |
| 5,568,691 | A | | 10/1996 | Rubin | |
| 6,718,651 | B2 | * | 4/2004 | Perez | A45D 20/30 |
| | | | | | 392/374 |
| 6,925,728 | B2 | * | 8/2005 | Busa | A45D 20/50 |
| | | | | | 34/92 |
| 6,928,235 | B2 | | 8/2005 | Pollack | |
| 8,434,238 | B2 | * | 5/2013 | Gross | A45D 20/12 |
| | | | | | 132/212 |
| 9,713,370 | B2 | * | 7/2017 | Thomason | A45D 20/12 |
| 10,076,176 | B2 | | 9/2018 | Yang et al. | |

(Continued)

FOREIGN PATENT DOCUMENTS

| CN | 103244919 A | 8/2013 |
| CN | 107616611 A | 1/2018 |

(Continued)

*Primary Examiner* — Stephen M Gravini
(74) *Attorney, Agent, or Firm* — Birch, Stewart, Kolasch & Birch, LLP

(57) ABSTRACT

A dryer stand including a seat to receive a dryer thereon, a base spaced apart from the seat downward, a side cover forming a side appearance between the base and the seat, and a light positioned in an internal space defined by the side cover.

18 Claims, 14 Drawing Sheets

(56) References Cited

U.S. PATENT DOCUMENTS

| | | | |
|---|---|---|---|
| 2002/0006275 A1 | 1/2002 | Pollack | |
| 2020/0085251 A1* | 3/2020 | Youn | A45D 20/12 |
| 2020/0085254 A1* | 3/2020 | Yoo | A45D 20/12 |
| 2020/0085257 A1* | 3/2020 | Yoo | A47K 10/48 |

FOREIGN PATENT DOCUMENTS

| | | | | |
|---|---|---|---|---|
| CN | 108124364 A | | 6/2018 | |
| DE | 93 18 128 U1 | | 3/1994 | |
| DE | 20 2005 003 430 U1 | | 6/2005 | |
| EP | 2805641 A1 | | 11/2014 | |
| EP | 3626116 A1 | * | 3/2020 | ........... A01K 13/001 |
| EP | 3226715 B1 | * | 1/2022 | ............. A45D 19/04 |
| JP | 6975043 B2 | * | 12/2021 | ............. A45D 19/04 |
| KR | 20-0465860 Y1 | | 3/2013 | |

* cited by examiner

DRYER STAND

CROSS REFERENCE TO RELATED APPLICATIONS

This application claims the priority benefit of U.S. Provisional Application No. 62/733,478, filed on Sep. 19, 2018, Korean Patent Application No. 10-2019-0021182, filed on Feb. 22, 2019, and Korean Patent Application No. 10-2019-0021184, filed on Feb. 22, 2019, the entire disclosures of all of which are hereby expressly incorporated by reference into the present application.

BACKGROUND OF THE DISCLOSURE

Field of the Disclosure

The present disclosure relates to a dryer stand on which a dryer for drying a given object is mounted. More particularly, the present disclosure relates to a dryer stand equipped with a lighting device.

Description of the Related Art

If a dryer is used to dry the human body, in general, a user holds the dryer and performs drying while moving the dryer so that the air outlet of the dryer is directed toward a portion to be dried.

In particular, if a target to be dried is an infant or a pet, it is necessary to perform drying, including drying an entire body, using heated air of a relatively low temperature by taking into consideration the skin of the infant or pet that is vulnerable to a high temperature. Accordingly, there is a problem in that a user feels an inconvenience if the user holds the dryer and performs the drying because the drying time is long.

Accordingly, there is disclosed a stand apparatus capable of holding a dryer, such as a stand apparatus for drying a pet dog (Korean Patent Application Publication No. 10-2013-0039983). The stand apparatus capable of holding a dryer and other apparatuses capable of holding a dryer do not disclose a function other than a stand on which a dryer is held.

In the rainy season, summer and winter, a pet rarely goes out due to the influence of the weather. It has been known that a person or pet may experience seasonal depression if the time exposed to light is reduced.

Furthermore, if a target to be dried is an infant or a pet, there is a problem in that the infant or pet may avoid drying using a dryer because the infant or pet feels fear due to noise generated when the dryer operates.

SUMMARY OF THE DISCLOSURE

A problem to be solved by the present disclosure is to provide a dryer stand capable of drying an object to be dried without holding a dryer and manipulating the dryer.

A problem to be solved by the present disclosure is to provide a dryer stand capable of reducing seasonal depression attributable to insufficient going-out (e.g., insufficient exposure to light).

A problem to be solved by the present disclosure is to provide a dryer stand capable of preventing an infant or a pet from avoiding drying using a dryer because the infant or a pet approaches the dryer stand with fear.

A problem to be solved by the present disclosure is to provide a dryer stand capable of preventing dazzling because light radiated by a lighting device provided within the dryer stand is radiated to a wide area.

A problem to be solved by the present disclosure is to provide a dryer stand in which the state of a battery for supplying power to a dryer and a lighting device can be checked at a look or glance.

The objects of the present disclosure are not limited to the above-described objects and the other objects will be understood by those skilled in the art from the following description.

In an aspect of the present disclosure, the dryer stand includes a seating unit (or seat) in which a dryer for discharging air for drying is seated, a base spaced apart from the seating unit in a downward direction and positioned at the bottom of the dryer stand, a side cover forming a side appearance between the base and the seating unit, and a lighting device (or light) positioned in an internal space defined by the side cover.

The side cover may include a front cover forming an appearance of a front toward a direction in which the dryer discharges the air.

The front cover may be made of a transparent or semi-transparent material in order to radiate light, radiated from the lighting device, to the outside The front cover may have an arc-shaped section.

The dryer stand may further include a stem supporting the seating unit. The stem may include a lower plate positioned above the base and a vertical plate upward extended from the lower plate.

The dryer may have an air outlet formed toward a front.

The lighting device may be positioned in front of the vertical plate.

A concave part depressed in a shape corresponding to a shape of the lighting device from a front surface may be formed in the vertical plate. In other words, the vertical plate includes a front surface having a concave part being depressed in a rear direction, the concave part of the vertical plate having a shape corresponding to a shape of the lighting device. The lighting device may be inserted into the concave part.

The dryer stand may further include a reflection plate disposed on the lower plate and configured to reflect light radiated from the lighting device. The reflection plate may be convexly formed upward toward the central part of the lower plate. That is, the reflection plate may have a convex shape formed in an upward direction from the lower plate.

The lighting device may include an organic light emitting diode (OLED) panel.

The side cover may include a front cover forming an appearance of a front toward the direction in which the dryer discharges the air and have an arc-shaped section. The front cover may be made of a transparent or semi-transparent material. The OLED panel may have an arc-shaped section and may be positioned to face an inner side of the front cover.

The lighting device may include a lighting-emitting panel and a lighting frame, the lightning frame may be positioned at an edge of the light-emitting panel.

The dryer stand may further include a controller configured to control the turning off and turning on of the lighting device.

The dryer stand may further include a target drying object detection device for detecting an object, including an object approaching the dryer stand.

The controller turns on the lighting device when the target drying object detection device detects an approaching object within a given (e.g., a predetermined) distance range.

The controller may turn on the lighting device when the target drying object detection device detects an object within the given (e.g., a predetermined) distance range during a preset first time or more.

The controller may turn off the lighting device when the target drying object detection device does not detect an object within the given (e.g., a predetermined) distance range during a second time or more while the lighting device is turned on.

The second time is set longer than the first time.

The controller may turn on the lighting device when the dryer is operated and turns off the lighting device when the dryer is not operated.

The dryer stand may further include a battery charged by external power, the battery applying power to the dryer and to the lighting device.

The controller may display a charging ratio (e.g., amount of remaining power) of the battery through the lighting device when the battery is charging.

The controller may turn off the lighting device when the battery is fully charged.

The lighting device may include a light-emitting panel.

The controller may turn on an area that belongs to a total area of the light-emitting panel and that has a ratio identical with a charging ratio of the battery. That is, the The controller may turn on an area that belongs to a total area of the light-emitting panel and that has a ratio corresponding to a charging ratio of the battery from a lowest side of the light-emitting panel. That is, the controller may turn on an area of the light-emitting panel corresponding to a ratio of the remaining power of the battery from the lowest side of the light-emitting panel.

The controller may indicate that the amount of remaining power of the battery is a reference amount of remaining power or less through the lighting device when the supply of external power is stopped and the amount of remaining power of the battery is the preset reference amount of remaining power or less.

The controller may turn on a red light of the lighting device when the supply of external power is stopped and the amount of remaining power of the battery is a preset reference amount of remaining power or less.

Details of other embodiments are included in the detailed description and drawings.

DESCRIPTION OF EXEMPLARY EMBODIMENTS

Figure 1:
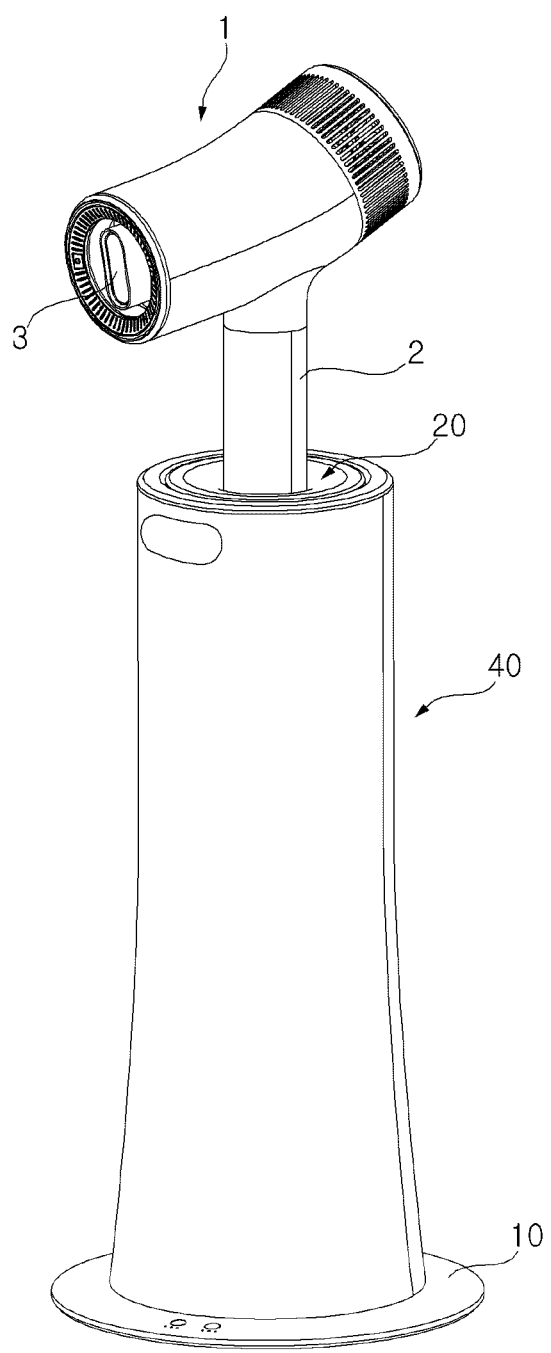
FIG. 1 is a perspective view showing the state in which a dryer has been mounted on a dryer stand according to an embodiment of the present disclosure.

The advantages and features of the present disclosure and a method of achieving them will become apparent with reference to the embodiments described in detail below together with the accompanying drawings. However, the present disclosure is not limited to the embodiments set forth herein but may be embodied in many different forms, and these embodiments are provided so that the disclosure of the present disclosure is complete and that those skilled in the art will fully understand the scope of the present disclosure, and the present disclosure is only defined by the scope of the claims. Like reference numerals designate like elements throughout the specification.

Hereinafter, embodiments of the present disclosure are described with reference to the accompanying drawings for illustrating a dryer stand.

Figure 2:
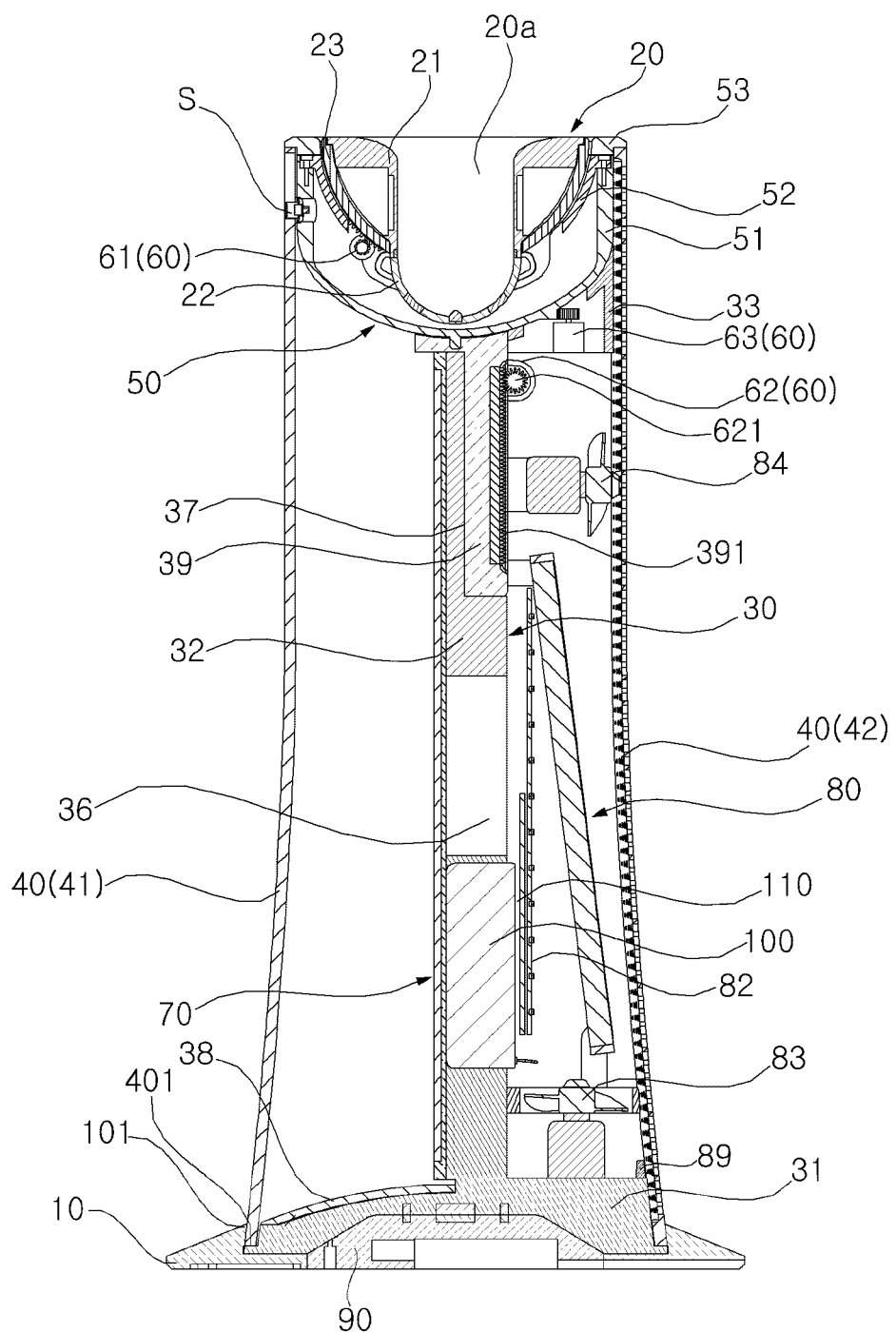
FIG. 2 is a longitudinal cross-sectional view showing the state in which the dryer stand and a docking station have been coupled according to an embodiment of the present disclosure.

Referring to FIGS. 1 and 2, the dryer stand according to an embodiment of the present disclosure includes a base 10 positioned at the bottom of the dryer stand and performing a support function, a seating unit 20, 50 spaced apart from the base 10 upward and having a dryer held therein, a side cover 40 positioned between the base 10 and the seating unit 20, 50 to form a side appearance of the dryer stand, and a lighting device 70 positioned in the internal space of the dryer stand. Furthermore, the dryer stand may further include a controller 110 for controlling the turn on/off of the lighting device 70.

The base 10 may have a greater width than the side cover 40. The lower part of the side cover 40 may have a width gradually increasing toward the lower side from an upper side. The side cover 40 is generally formed in a cylindrical shape, but may have a shape in which the lower part of the side cover defined by a central part of the side cover in the top and bottom direction has a diameter gradually increasing toward the lower side. The base 10 may be formed in a ring shape having a greater diameter than the diameter of the side cover 40.

The dryer stand can be stably supported although it is configured in a long shape up and down so that the seating unit 20, 50 on which the dryer 1 is mounted is positioned at a given height for user convenience. That is, the dryer stand can have a stable configuration and have a long length.

The side cover 40 is positioned to surround a stem 30, and defines an internal space different from the outside (e.g., an indoor space in which the dryer stand is positioned) of the dryer stand by forming a side outskirt.

The seating unit 20, 50 may include a receptacle 20 on which a dryer 1 is detachably mounted and a supporter 50 supporting the receptacle 20 so that the receptacle is movable. The supporter 50 may support the receptacle 20 movably between the receptacle 20 and the stem 30.

The "move" or "derivatives thereof" is used as a comprehensive meaning, including tilting rotation meaning rotation in the front and back directions, left and right rotation meaning rotation in the left and right directions, or a straight movement meaning a movement in the up and down directions or a vertical direction, and the same is applied hereinafter.

The lighting device 70 is equipped with a light-emitting body for radiating light.

The dryer stand according to an embodiment of the present disclosure may include the stem 30 standing upright between the base 10 and the seating unit 20, 50 in an upwards direction (i.e., extending up and down) and supporting the receptacle 20 so that the receptacle 20 is positioned upwardly at a given (e.g., predetermined) height from the base 10.

Furthermore, the dryer stand may include an air purifier 80 for purifying air in the internal space of the dryer stand.

Furthermore, the dryer stand may include a motor 60 for moving the seating unit 20, 50.

Furthermore, the dryer stand may include a battery 100 charged by external power. The battery 100 may supply power to the dryer 1, the lighting device 70 and the air purifier 80.

Furthermore, the dryer stand according to an embodiment of the present disclosure may include a target drying object detection device S for detecting the size or location of an object to be dried. The dryer stand may include the controller 110 for controlling the operation of the motor 60 based on a size or location of an object to be dried detected by the target drying object detection device. The controller 110 may control an overall operation of the dryer stand, including controlling the motor 60 for moving the seating unit 20, 50 and controlling the lighting device 70.

Furthermore, the dryer stand according to an embodiment of the present disclosure includes a power supply device for supplying external power to the inside of the dryer stand if the dryer stand is placed on a docking station 90 for supplying the external power.

If the dryer stand is placed on the docking station 90, the battery 100 is charged by the external power, and the battery may apply power to the dryer 1, the lighting device 70, the air purifier 80 and the controller 110.

The elements of the dryer stand are described more specifically below.

Figure 3:
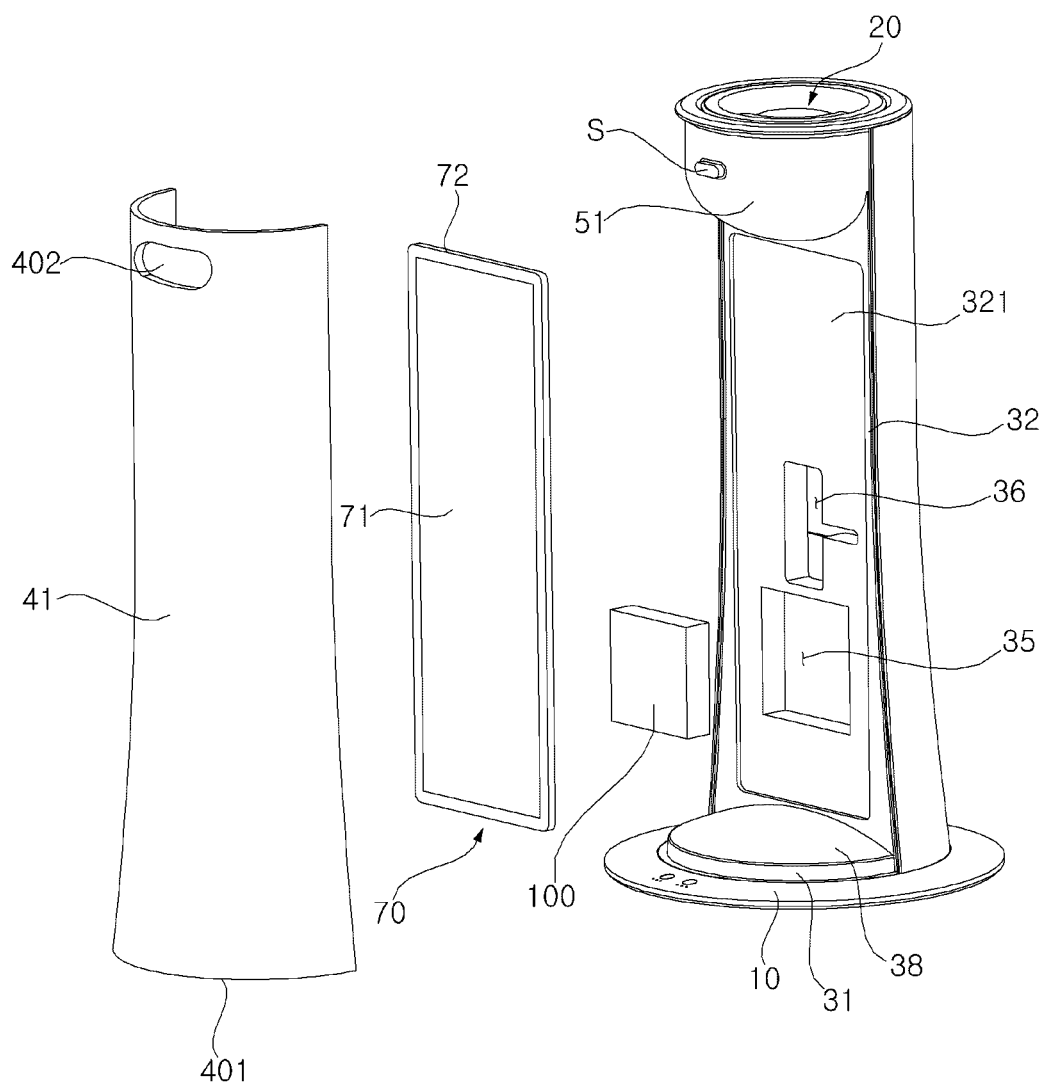
FIG. 3 is an exploded perspective view of the front of the dryer stand according to a first embodiment of the present disclosure.
Figure 5:
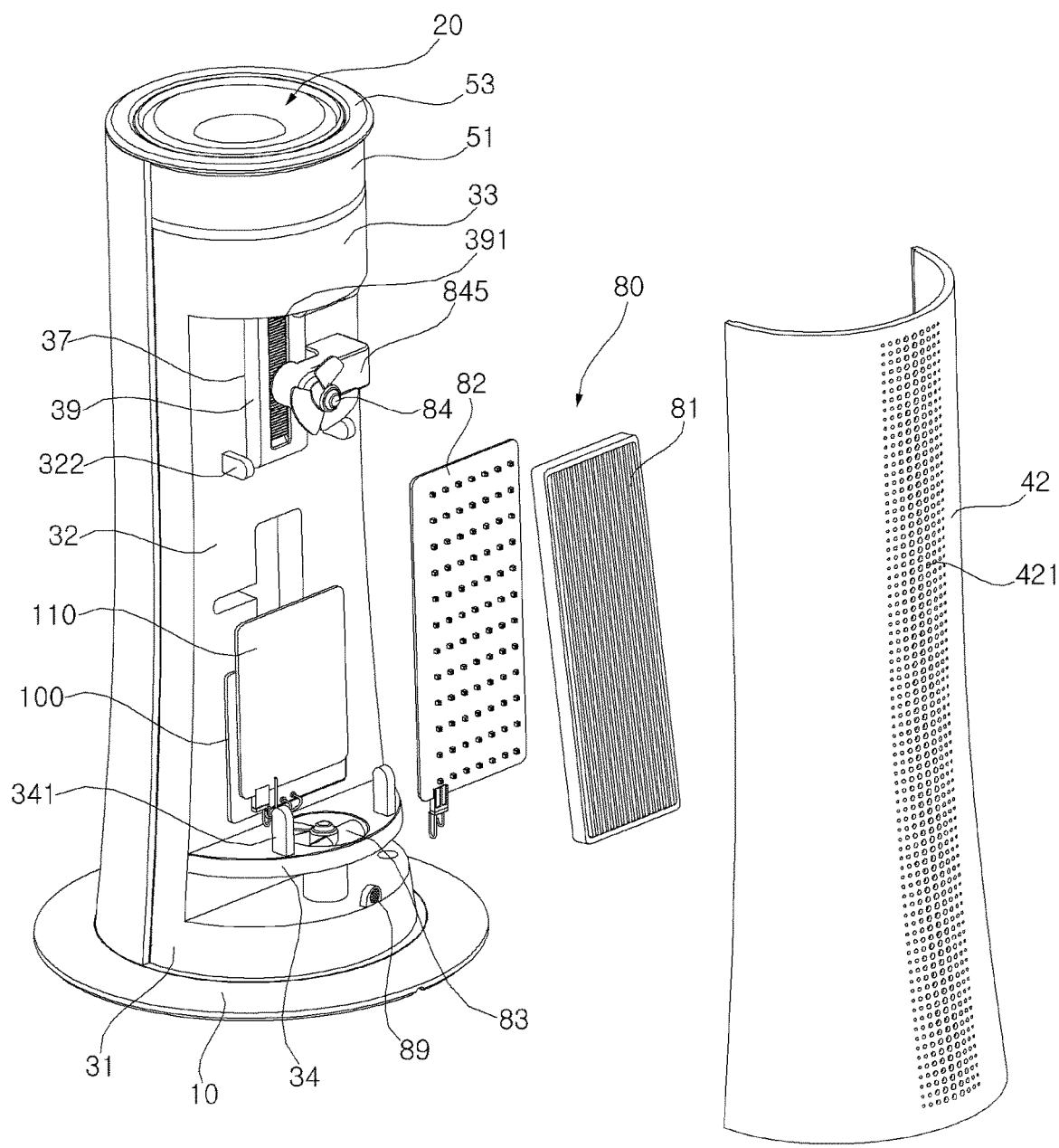
FIG. 5 is an exploded perspective view of the back of the dryer stand according to an embodiment of the present disclosure.

Referring to FIGS. 2, 3 and 5, the stem 30 may support the seating unit 20, 50. The lighting device 70 and the air purifier 80 may be disposed in the stem 30. The stem 30 may include a lower plate 31 engaging with the bottom 401 of the side cover 40, a vertical plate 32 extending upwards from the lower plate 31, and a backward extension part 33 extending backwards from an upper side end of the vertical plate 32.

The lower plate 31 may be positioned on top of the base 10 and coupled to the base 10 by a fastening means, such as a set screw. The bottom of the base 10 may have a base hollow unit 12 formed at its center. Accordingly, the bottom of the base 10 is formed in a ring shape, so the bottom of the lower plate 31 may be exposed when the dryer stand is viewed at the bottom.

When the dryer stand is mounted on the docking station 90, the top side of the docking station 90 is protruded upward through the base hollow unit 12 of the base 10, and may come in contact with the bottom of the lower plate 31. Terminals that are electrically connected may be provided at the bottom of the lower plate 31 and the top side of the docking station 90.

A reflection plate 38 may be positioned on the top side of the front of the lower plate 31. A suction fan 83 may be positioned on the top side of the rear of the lower plate 31. The outer circumference surface of the lower plate 31 may be formed in a shape corresponding to the inner circumference surface of the bottom of the side cover 40. The lower plate 31 may be engaged with the bottom 401 of the side cover.

The vertical plate 32 is upward extended from the lower plate 32, and may partition the internal space of the dryer stand into a front part and a rear part. The front means a direction (i.e., direction in which the air outlet 3 is positioned) in which the dryer 1 held in the seating unit 20, 50 discharges air. The back means a direction opposite the front.

A partition wall 34 that is protruded backward may be formed at the bottom of the vertical plate 32. The partition wall 34 may partition the rear part of the internal space into the space to which air is input and the space in which air is purified and discharged. A hole may be formed in the partition wall 34, and the partition wall may surround the suction fan 83. That is, the partition wall 34 may function as the housing of the suction fan 83.

The outer circumference surface of the partition wall 34 may be formed in a shape corresponding to a portion that belongs to the inner side of a back cover 42 and that is opposite the outer circumference surface of the partition wall 34. Furthermore, the outer circumference surface of the lower plate 31 may be formed in a shape corresponding to the back cover 42. The back cover 42 is positioned to come in contact with the outer circumference surface of the lower plate 31 and the partition wall 34, so external air can be efficiently sucked and blown upward when the suction fan 83 operates.

The lighting device 70 may be positioned on the front surface of the vertical plate 32. A discharge fan 84, a filter 81 and a light-emitting module 82 may be disposed on the back surface of the vertical plate 32. Furthermore, a vertical plate hollow unit 35 is formed on the lower side at the center of the vertical plate 32, so the battery 100 may be positioned in the vertical plate hollow unit 35. A hole 36 through which an electric wire passes may be formed above the vertical plate hollow unit 35. The controller 110 may be positioned in the rear of the battery 100. That is, the controller 110 may be positioned at a rear surface of the battery 100.

Furthermore, a groove 37 that is long up and down (e.g., extends in a vertical direction) is formed in a rear of an upper side of the vertical plate 32. Accordingly, at least part of a vertical rod 39 may be inserted into the groove 37 so that the vertical rod 39 is movable up and down within the groove 37.

Left and right ends of the vertical plate 32 are formed in shapes corresponding to left and right ends of the front cover 41 and left and right ends of the back cover 42, so the left and right ends of the vertical plate 32 and the side cover 40 may be positioned to come in contact with each other. That is, left and right end surfaces of the vertical plate 32 engage corresponding left and right end surfaces of the front cover 41 and of the back cover 42.

The backward extension part 33 may be backward extended (e.g., spaced from in a rearward a rearward direction) from the top side end of the vertical plate 32 and bent downward (e.g., extends in a downward direction). The top side of the backward extension part 33 is formed in a shape corresponding to the lower side of the supporter body 51 and may be positioned to surround the lower rear side of the seating unit 20, 50.

Referring to FIG. 2, the dryer stand includes the vertical rod 39 positioned beneath the seating unit 20, 50. The vertical rod 39 is coupled to the vertical plate 32 and may support the seating unit 20, 50 so that the seating unit is movable up and down.

A rack gear 391 is formed on the rear side of the vertical rod 39. The rack gear 391 is geared with a pinion gear 621 fixed to the rotation shaft of an elevation motor 62. Accordingly, the vertical rod 39 moves up and down as the elevation motor 62 is rotated forward and backward.

The supporter 50 may be positioned above the vertical rod 39. The receptacle 20 on which the dryer 1 is mounted may be received in the supporter 50 in such a way as to be movable.

Referring to FIGS. 2, 6, 7 and 8, the seating unit 20, 50 may include the receptacle 20 on which the dryer 1 is mounted detachably and the supporter 50 supporting the receptacle 20 movably. That is, the supporter 50 may permit the receptacle 20 to move.

The supporter 50 may include a supporter body 51 rotatably connected to the top side of the vertical rod 39 and a guide supporter 52 fixed to the top side of the supporter body 51 by a set screw 514 and received in the supporter body 51.

Figure 7:
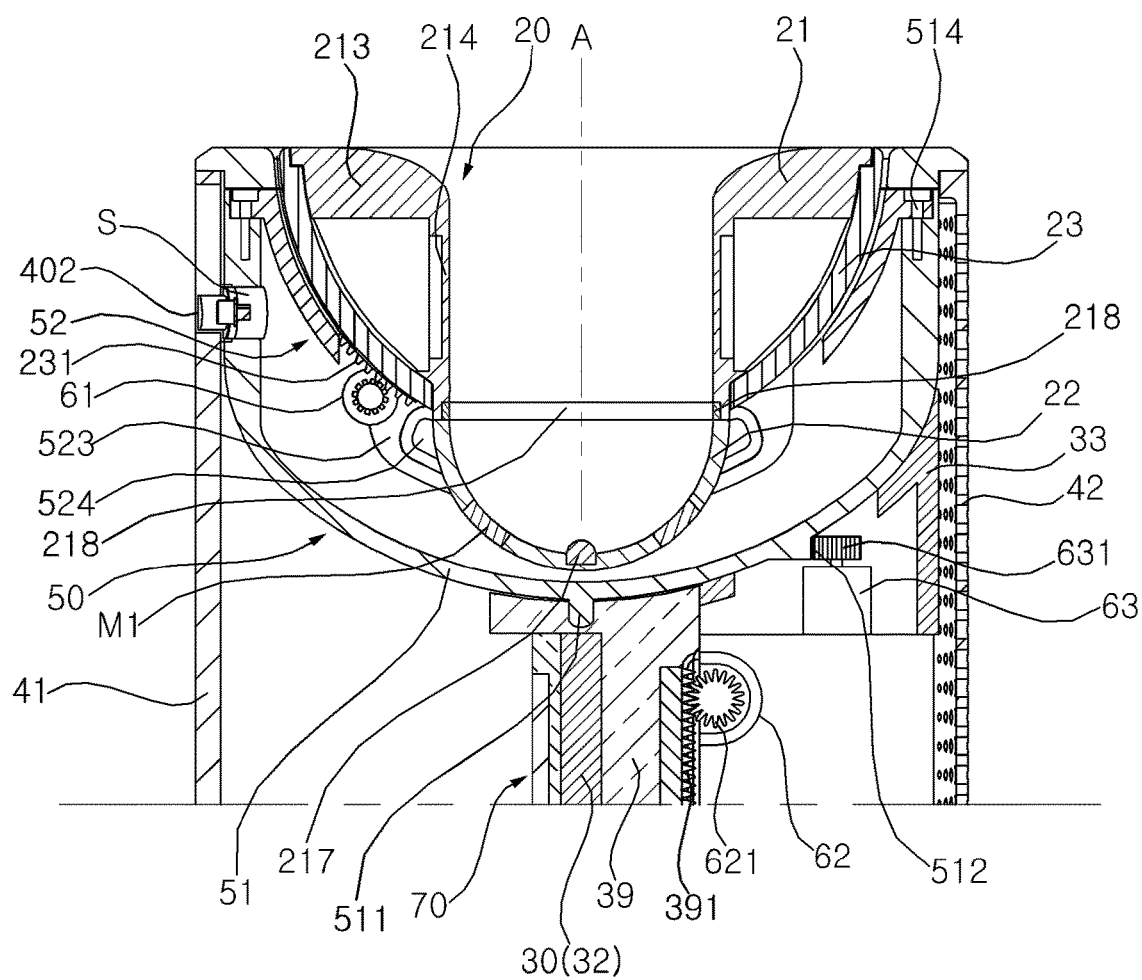
FIG. 7 is a cross-sectional view of the upper part of the dryer stand according to an embodiment of the present disclosure.
Figure 8:
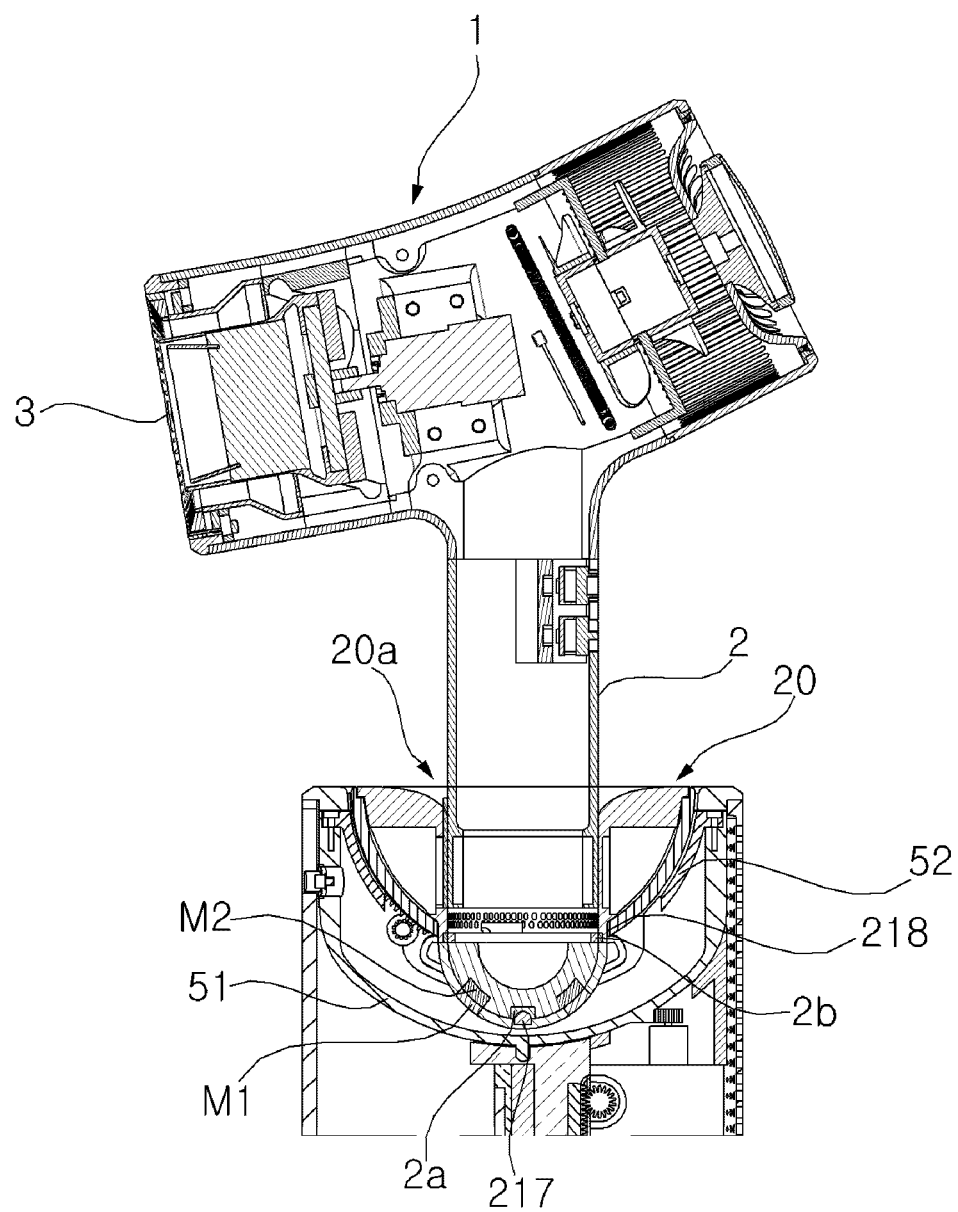
FIG. 8 is a cross-sectional view of the upper part showing the state in which the dryer has been mounted on the dryer stand according to an embodiment of the present disclosure.

As shown FIG. 7, the supporter body 51 is formed in a tub shape (e.g., a convex shape) having an open top and a lower part of an approximately hemispheric type. A protruded part 511 is formed at the bottom center of the supporter body 51. Accordingly, the protruded part 511 may be inserted into a groove formed in a top side of the vertical rod 39 in such a way as to be rotated. That is, the protruded part 511 may fit into the groove formed in the top side of the vertical rod 39 and the supporter body 51 may be rotatable with respect to the rod 39 via the protruded part 511.

Gear teeth 512 laterally extended in an arc form are formed on the circumference surface on the lower side of the supporter body 51. The gear teeth 512 are geared with a pinion 631 fixed to the rotation shaft of the rotation motor 63. When the rotation motor 63 is rotated forward and backward, the supporter body 51 and the guide supporter 52 fixed thereto are rotated left and right around a vertical axis A, respectively. That is, when the rotation motor 63 is rotated in a forward direction, the supporter body 51 and the guide supporter 52 are rotated in a counterclockwise direction around the vertical axis A. Further, when the rotation motor 63 is rotated in a backward direction, the supporter body 51 and the guide supporter 52 are rotated in a clockwise direction around the vertical axis A.

Accordingly, the supporter body 51 and the guide supporter 52 may move up and down (e.g., in a vertical direction) when the elevation motor 62 is driven, and may rotate left and right (e.g., counterclockwise and clockwise) when the rotation motor 63 is driven.

The guide supporter 52 may include a guide body 521 of a horn shape (e.g., having a convex shape with two protruding members at an end thereof) having an open lower central part 522 and having an inner side formed in a downward arc shape and a pair of guide rails 523 downwardly protruded from both ends of the guide body 521 and having a guide groove 524 of an arc form (e.g., an arc shape) formed in a front to back direction. That is, each guide rail 523 includes a guide groove 524 having an arc shape from a front direction to a back direction. A buffering rail 525 capable of performing a buffering function and reducing a friction force may be inserted into each guide rail 523 via the respective guide groove 524. In order to guide the rotation and tilting of the receptacle 20 in the front and rear direction more stably, a protruded part 232 is formed at the outer side of the tub cover 23, and a groove 526 into which the protruded part 232 is inserted and guide may be formed in the inner side of the guide body 521

The receptacle 20 on which the dryer 1 is mounted may include a tub 21, 22 forming a groove 20a into which a grip 2 of the dryer is inserted. The tub 21 may include an upper tub 21 and a lower tub 22, and may include a tub cover 23 surrounding the outskirts of the upper tub 21.

The upper tub 21 may include a tub body 211 having an approximately hemispheric shape whose top is wide and bottom is narrow and a lower protruded part 212 downward extended from the tub body 211. A concave part 213 that is inward depressed may be formed in at least one side of the tub body 211. The upper tub 21 may include an aperture 216 that forms a portion of the groove 20a of the tub 21, 22. That is, the groove 20a of the tub 21, 22 includes an aperture 216 of the upper tub 21.

The lower tub 22 may include an aperture 226 that forms a portion of the groove 20a of the tub 21, 22. That is, the groove 20a of the tub 21, 22 may also include the aperture 226 of the lower tub 22. A portion 214 positioned between the concave part 213 and the groove 20a has a smaller thickness than other portions due to the concave part 213. Accordingly, heat generated from the inside of the grip 2 of the dryer inserted into the groove 20a while the dryer 1 operates can be discharged through the concave part 213.

Grooves 225 may be formed on a top surface of the lower tub 22 for receiving protruded parts 215 of the upper tube 21. The protruded parts 215 may be formed at the bottom of the upper tub 21, and the protruded parts 215 may be inserted into respective grooves 225 and integrated with the upper tub 21. Accordingly, the upper tub 21 and the lower tub 22 may be integrated and coupled. Protruded pieces 224 are coupled to both sides of the lower tub 22 by set screws 227. The protruded pieces 224 may be inserted into the guide groove 524 formed in the guide rail 523 of the guide supporter 52 in such a way as to move. In order to guide the rotation and tilting of the receptacle 20 in the front and rear direction more stably, a protruded part 232 is formed at the outer side of the tub cover 23, and a groove 526 into which the protruded part 232 is inserted and guide may be formed in the inner side of the guide body 521.

The tub cover 23 is formed in an approximately hemispherical shape having a wide top and a narrow bottom, and is positioned to surround the outskirts of the tub body 211 of the upper tub 21, so the tub cover 23 may be integrated with the upper tub 21. That is, the tub cover 23 may have a top that is wider than a bottom.

Gear teeth 231 extended in an arc form up and down are formed in the outer surface of the tub cover 23. A pinion 611 fixed to the rotation shaft of the tilting motor 61 is geared with the gear teeth 231. When the tilting motor 61 is rotated forward and backward in the receptacle 20, the protruded pieces 224 may be guided along the guide groove 524 of the guide supporter 52 and tilted front and back, respectively.

That is, when the tilting motor 61 is rotated forward in the receptacle 20 the protruded pieces 224 may be guided along the guide groove 524 of the guide supporter 52 and tilted forward. Further, when the tilting motor 61 is rotated backward in the receptacle 20 the protruded pieces 224 may be guided along the guide groove 524 of the guide supporter 52 and tilted backward.

Accordingly, the receptacle 20 on which the dryer 1 is mounted can be tilted front and back (e.g., forward and backward) by the driving of the tilting motor 61, can be moved up and down (e.g., in the vertical direction) by the driving of the elevation motor 62, and can be rotated left and right (e.g., counterclockwise and clockwise) by the driving of the rotation motor 63. Accordingly, the direction of the air outlet 3 of the dryer 1 can be changed in various ways.

The top of the supporter 50 may be covered with the ring-shaped upper cover 53.

Furthermore, the target drying object detection device S, such as an image photographing device or a proximity sensor for detecting the size and location of an object to be dried, may be mounted on the front surface of the supporter body 51.

Figure 4:
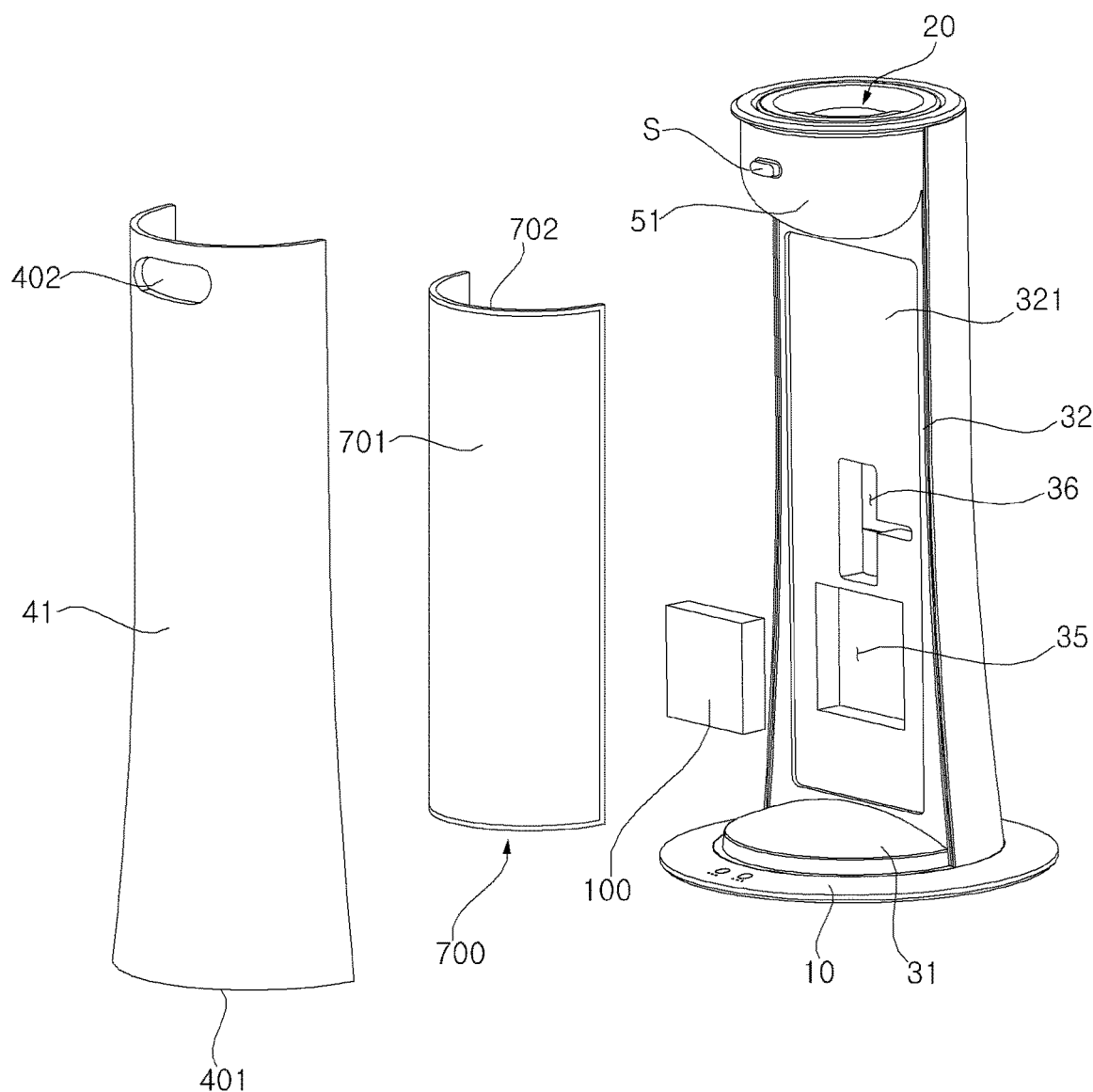
FIG. 4 is an exploded perspective view of the front of the dryer stand according to a second embodiment of the present disclosure.

Referring to FIGS. 3 to 5, the side cover 40 forming the side appearance of the dryer stand may include front and back covers 41 and 42. The front cover 41 is positioned at the front of the lighting device 70, and the back cover 42 is positioned in the rear of the air purifier 80. The side cover 40 may be inserted into a ring-shaped groove 101 of the bottom 401, which is formed by the base 10 and the lower plate 31 (refer to FIG. 2).

The front cover 41 may form an appearance of the front of the dryer stand, that is, the side to which the dryer 1 discharges air. The front cover 41 may be made of a transparent or semi-transparent material so that light radiated from the lighting device 70 is radiated to the outside.

The section of the front cover 41 may be formed in an arc form. That is, the front cover 41 may be formed in a pole shape of an approximately arc form. As described above, the lower part of the front cover 41 may be a pole of an arc form having a downward increasing diameter. The front cover 41 is made of a transparent or semi-transparent material, and has an arc-shaped section. Accordingly, light radiated from the lighting device 70 may be radiated toward the outside.

The back cover 42 is positioned in the rear of the front cover 41 (e.g., in a rearward direction), and may be coupled the front cover 41.

The back cover 42 may form a rear appearance of the dryer stand, that is, the side opposite the front. Multiple through holes 421 are formed in the back cover 42. When the suction fan 83 or/and the discharge fan 84 are driven, external air can be sucked into the back cover 42 through the through holes 421 and then discharged to the outside through the through holes 421 via the filter 81.

The through holes 421 are formed at least at the height between the partition wall 34 and lower plate 31 of the back cover 42, and are formed at the height where the discharge fan 84 is positioned. The through holes 421 may be formed up and down (e.g., in the vertical direction) from a portion that comes in contact with the lower plate 31 of the back cover 42 to a location higher than the discharge fan 84.

As the left and right ends of the vertical plate 32 and the back cover 42 are positioned to come in contact with the outer circumference surface of the partition wall 34 and the backward extension part 33, the back cover 42 can tightly cover the rear part of the internal space in which the air purifier 88 is positioned. Accordingly, air can enter or exit through the through holes 421 formed in the back cover 42, thereby being capable of performing air purification efficiently.

The upper sides of the front and back covers 41 and 42 are positioned to surround the supporter body 51 so that the supporter body 51 is movable up and down. A ring-shaped upper cover 53 is coupled to the top of the supporter body 51 and may be positioned at the top of the front and back covers 41 and 42 in such a way as to be movable.

The lighting device 70 of the dryer stand according to a first embodiment of the present disclosure is described with reference to FIG. 3.

The lighting device 70 according to the first embodiment of the present disclosure includes a light-emitting body, and may be positioned in front of the vertical plate 32. The light-emitting body may include a light-emitting diode (LED) light having an electric bulb or fluorescent lamp shape. Furthermore, the light-emitting body may include a light-emitting panel in which an LED is embedded or in which an organic light emitting diode (OLED) is embedded.

In an embodiment of the present disclosure, the light-emitting body may be the light-emitting panel 71 having low power consumption in order to reduce a user's or pet's depression. Hereinafter, an example in which the light-emitting body is a light-emitting panel 71 is described.

The lighting device 70 may include a light-emitting panel 71 and a lighting frame 72. The light-emitting panel 71 may be configured with an LED plate in which multiple LEDs are embedded. The light-emitting panel 71 may be formed in a rectangle shape that is long up and down (e.g., has a length extending in the vertical direction). The lighting frame 72 may be positioned at an edge of the light-emitting panel 71, and may surround the edge of the light-emitting panel 71.

Referring to FIG. 3, a concave part 321 that is backward depressed is formed in the front surface of the vertical plate 32, so the lighting frame 72 is inserted into the concave part 321. Accordingly, the lighting device 70 may be seated in the concave part 321 detachably. The concave part 321 may be depressed from the front surface of the vertical plate 32 in a shape corresponding to the shape of the lighting device 70.

The dryer stand can be prevented from being turned over because the lighting device 70 is inserted into the concave part 321 and thus the center of mass does not lean to any one side. That is, the center of mass of the dryer stand may be substantially at the center of the dryer stand.

The light-emitting panel 71 may be configured with an OLED panel in which OLEDs are embedded. It has been known that light radiated from an OLED has a spectrum most similar to that of natural light compared to other developed light-emitting bodies. Accordingly, if the light-emitting panel 71 is fabricated using OLEDs, a user's or pet's seasonal depression attributable to insufficient going-out (e.g., insufficient exposure to light) can be reduced.

Furthermore, the OLED generates less blue light. Blue light is blue-series light that belongs to a wavelength between 380 to 500 nm, and has the strongest energy among visible rays. Blue light is effective in raising a concentration and arousal, but causes somnipathy by disturbing the production of the melatonin hormone and causes xerophthalmia and macular degeneration. Accordingly, seasonal depression can be reduced and a disadvantage, such as somnipathy attributable to light pollution, can be prevented by fabricating the light-emitting panel 71 using OLEDs.

The OLEDs are fabricated to form a surface, form a surface light source, and can uniformly radiate light in a wide area. Accordingly, the OLEDs can improve the dignity of an indoor space because dazzling is small and a shadow is not cast strongly.

In the dryer stand according to the first embodiment of the present disclosure, the reflection plate 38 from which light radiated by the light-emitting panel 71 is reflected may be provided on the front top surface of the lower plate 31. The back top surface of the lower plate 31 has a horizontal plane. In contrast, the reflection plate 38 is convexly formed upward toward the central part of the lower plate 31. The reflection plate 38 is also formed in a shape corresponding to the shape of front top surface of the lower plate 31. Accordingly, light radiated by the light-emitting panel 71 can be uniformly directed toward the front cover 41.

A weight (not shown) having a given mass may be provided within the front side of the lower plate 31. The air purifier 80 is positioned in the stem 30 in the rear part of the internal space of the dryer stand, but is positioned from the vertical plate 32 toward the rear side, so the center of mass may be closer to the rear side. The weight provided within the front side of the lower plate 31 prevents the center of mass from leaning to one side and functions to make the center of mass low so that the dryer stand stably stands upright.

The lighting device 70 of the dryer stand according to a second embodiment of the present disclosure is described with reference to FIG. 4. A description of the same elements as those of the lighting device of the dryer stand according to the first embodiment is omitted.

The lighting device 70 according to the second embodiment of the present disclosure includes a light-emitting body. The light-emitting body includes an OLED panel 701.

An OLED panel 701 has a small thickness and may be bent. Accordingly, the light-emitting panel 701 is fabricated using OLEDs and configured to have an arc-shaped section, and may be positioned to face the inner side of the front cover 41. Accordingly, the radioactivity of light radiated from the OLED panel 701 can be improved.

The OLED panel 701 is curved and may be positioned to adhere to the inner side of the front cover 41.

Alternatively, the OLED panel 701 is curved, and may have both edges (or a lighting frame 702 positioned at edges) coupled to the vertical plate 32 and may be positioned to face the inner side of the front cover 41.

Although not shown, a lighting device support (not shown) curved to correspond to the OLED panel 701 may be coupled to the front surface of the vertical plate, and the OLED panel 701 may be positioned in the lighting device support. Alternatively, the front surface of the vertical plate 32 may be curved to correspond to the OLED panel 701, and the OLED panel 701 may be positioned in the curved front surface of the vertical plate 32.

If the light-emitting panel 71 is fabricated using OLEDs, unlike in FIG. 4, the lighting frame 72, 702 may be positioned only in the edge on any one side without surrounding the edge of the entire panel 71, 701.

A plurality of LEDs and/or OLEDs for radiating light having different wavelengths may be mounted on the lighting device 70. Accordingly, the light of a color preferred by an object to be dried can be selected and radiated. A degree of drying of a portion to be dried can be detected while dry is performed, and light of a different color can be radiated based on a detected level of dry.

Furthermore, the amount of charging of the battery 100 may be displayed by turning on only some of the entire area of the light-emitting panel 71, so a user can check the amount of remaining power of the battery 100 at a look (e.g., a glance). This is described in detail later.

Referring to FIGS. 2 and 5, the air purifier 80 may be positioned in an internal space defined by the side cover 40. The air purifier 80 may include the fan 83, 84 for generating a flow of air and the filter 81 positioned in the flow pass of air moved by the fan 83, 84. The air purifier 80 may be positioned in the rear part of the internal space. The through holes 421 through which air is received or exits may be formed in the side cover 40. The through holes 421 may be formed in the back cover 42.

Accordingly, light therapy, such as the dry of an object to be dried through the dryer 1 or a reduction of a depression using the lighting device 70, may be performed in front of the dryer stand. Air circulation and purification may be performed in the rear of the dryer stand.

The air purifier 80 may include the filter 81. The filter 81 may include a photocatalytic filter 81 that decomposes a harmful substance through a photochemical reaction. The description of the filter 81 may be applied to the photocatalytic filter 81 without any change.

The air purifier 80 may include a light-emitting module 82 for activating the photocatalytic filter.

Furthermore, the air purifier 80 of the dryer stand may include the fan 83, 84 for generating a flow of air. The fan 83, 84 may include a suction fan 83 for sucking external air and a discharge fan 84 for discharging air, passing through the photocatalytic filter 81, to the outside.

Each of the suction fan 83 and the discharge fan 84 may include a rotor blade and a motor. The motor for driving the suction fan 83 and the discharge fan 84 may be a motor having a variable rotation speed.

The suction fan 83 may suck external air and blow air upward (e.g., in an upward direction). The discharge fan 84 may discharge air, upward moved by the suction fan 83 and passing through the filter 81, to the outside.

The suction fan 83 may be positioned above the lower plate 31 at the back thereof. The motor of the suction fan 83 may be positioned on the lower plate 31 so that the rotor blade of the suction fan 83 is spaced apart from the lower plate. The rotor blade of the suction fan 83 may be positioned upward.

Furthermore, a partition wall 34 is upward spaced apart from the lower plate 31. A hole is formed in the partition wall 34 and may surround the suction fan 83 (the rotor blade of the suction fan). That is, the suction fan 83 may extend into a hole formed in the partition wall 34. Accordingly, when the suction fan 83 is driven, external air is input to the space between the partition wall 34 and the lower plate 31 through the through holes 421 formed on the lower side of the back cover 42, and is upward blown through the hole that surrounds the suction fan 83.

The discharge fan 84 is positioned on the rear surface of the vertical plate 32, and may be positioned on the side higher than the suction fan 83. That is, the discharge fan 84 may be positioned on the side higher than the partition wall 34. The motor of the discharge fan 84 may be directed toward the vertical plate 32, and the rotor blade may be positioned toward the back cover 42.

As shown in FIG. 4, the discharge fan 84 may be supported by a discharge fan support 845 coupled to the vertical plate 32. The discharge fan support 845 is coupled to the rear surface of the vertical plate 32, and may be backward extended from the rear surface of the vertical plate 32 and then laterally bent. The discharge fan 84 may be positioned behind the vertical rod 39. The motor of the discharge fan 84 may be positioned in the discharge fan support 845. The rotor blade of the discharge fan 84 may be positioned toward the back cover 42.

The discharge fan 84 may be positioned in such a way as to be backward spaced apart from the vertical plate 32 by the discharge fan support 845. A vertical rod 39 may be positioned between the space in which the vertical plate 32 and the discharge fan 84 are spaced apart.

If both the suction fan 83 and the discharge fan 84 are driven, air that is received from the outside by the suction fan 83 and blown upward rapidly passes through the filter 81, and is then discharged to the outside by the discharge fan 84. Accordingly, if a pollution level of air outside the dryer stand (e.g., indoor air, etc.) is high, air can be circulated and purified by rapidly driving both the suction fan 83 and the discharge fan 84.

If any one of the suction fan 83 and the discharge fan 84 is driven, the drift velocity of air is slow, and the time during which air can stay within the air purifier 80 may be extended. Accordingly, if a pollution level of external air is relatively low, a small amount of pollution materials can be decomposed or filtered out and noise from the fan can be reduced by increasing the time during which air comes in contact with the filter.

In the case where any one of the suction fan 83 and the discharge fan 84 is driven, if only the discharge fan 84 is driven, air can be sucked because air is discharged to the outside by the discharge fan 84 and thus pressure within the space where the air purifier is positioned is reduced. However, air may be received through the through holes positioned higher than the partition wall. In such a case, air may be discharged without passing through the filter.

In contrast, if only the suction fan 83 is driven, external air is received because air in the space between the partition wall 34 and the lower plate is blown upward from the partition wall 34 and thus pressure is reduced. The received air passes through the filter and is accumulated on the upper side and then discharged to the outside. Accordingly, if only the suction fan 83 is driven, the time taken for air to stay within the air purifier 80 can be increased, and sucked air can be discharged after passing through the filter 81.

Accordingly, if only any one of the suction fan 83 and the discharge fan 84 is driven, the suction fan 83 may be preferably driven.

The filter 81 may be positioned between the suction fan 83 and the discharge fan 84. The filter 81 may include a first face through which air is received and a second face from which air is discharged. The first face may be positioned toward the suction fan 83, and the second face may be positioned toward the discharge fan 84.

The filter 81 may be positioned to upward lean toward the center of the internal space. The filter 81 may have the upper side supported by the vertical plate 32 and have the lower side supported by the partition wall 34.

Accordingly, the dryer stand occupies a small volume and widens the area of the filter 81 with which air comes in contact, thus being capable of efficiently purifying air.

The stem 30 may include an upper trapping piece 322 protruded backward from the vertical plate 32 and a lower trapping piece 341 protruded upward from the partition wall 34. The filter 81 may be positioned in the upper trapping piece 322 and the lower trapping piece 341 detachably.

The upper trapping piece 322 may be configured as a pair of spaced upper trapping pieces 322 to support the upper side of the filter 81. The lower trapping piece 341 may be configured as a pair of spaced lower trapping pieces 341 to support the lower side of the filter 81. The filter 81 is interposed between the pair of upper trapping pieces 322 and the pair of lower trapping pieces 341, and may be detachably positioned with inclination in the state in which the lower part of the filter is more backward protruded than the upper part thereof.

The photocatalytic filter 81 can also have a deodorization function. The photocatalytic filter 81 can decompose a harmful substance through a photochemical reaction. The installation location and structure of the photocatalytic filter 81 are the same as those of the filter 81.

The photocatalytic filter 81 consists of a permeability adsorption material that adsorbs a harmful substance in the air, photocatalytic adhered to the permeability adsorption material, and a promoter helping the activation of the photocatalytic.

The permeability adsorption material has several layers of stacked wrinkles using pulp as a base material so that the area coming in contact with air while the air passes through is large. The permeability adsorption material may include a porous material so that a harmful substance is adsorbed. The porous material may be activated carbon, zeolite, activated alumina, a clay molding, a fiber molding, ceramics, metal, or plastic.

The photocatalytic decomposes a harmful substance, adsorbed to the permeability adsorption material, through a photochemical reaction. The photocatalytic according to the present embodiment is preferably a visible photocatalytic that may act on a visible ray emitted from sunlight, a fluorescent lamp or an incandescent light. The photocatalytic may include at least one selected from a group comprising tungsten oxide ($WO_3$), titanium oxide ($TiO_2$), zinc oxide (ZnO), zirconium oxide ($ZrO_2$) or a solid solution thereof.

The promoter may include at least one metal, oxide or compound selected from platinum (Pt), rhodium (Rh), ruthenium (Ru), palladium (Pd), silver (Ag), copper (Cu), or zinc (Zn). In the present embodiment, the promoter may be platinum (Pt) in order to maximize the activation of the photocatalytic attributable to a visible ray.

The air purifier may include the light-emitting module 82 for activating the photocatalytic filter 81. The light-emitting module 82 may be a blue light-emitting module 82. The light-emitting module 82 may include a plurality of light-emitting bodies. The light-emitting body may be a blue LED. The light-emitting module 82 may be a blue LED panel including blue LEDs.

The light-emitting module 82 may be positioned in the vertical plate 32, and may be positioned in parallel to the vertical plate 32 between the vertical plate 32 and the photocatalytic filter 81.

Figure 9:
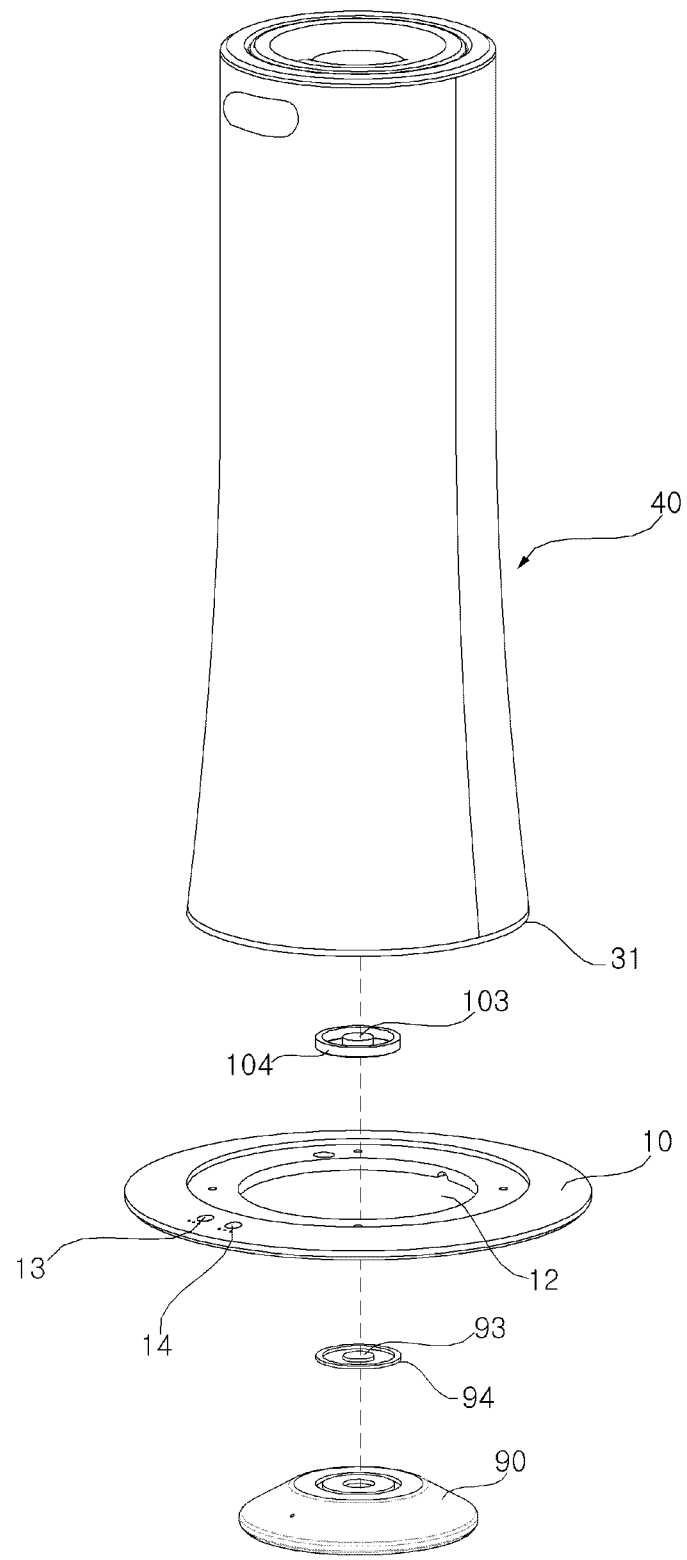
FIG. 9 is an exploded perspective view of the lower part of the dryer stand and the docking station according to an embodiment of the present disclosure.
Figure 10:
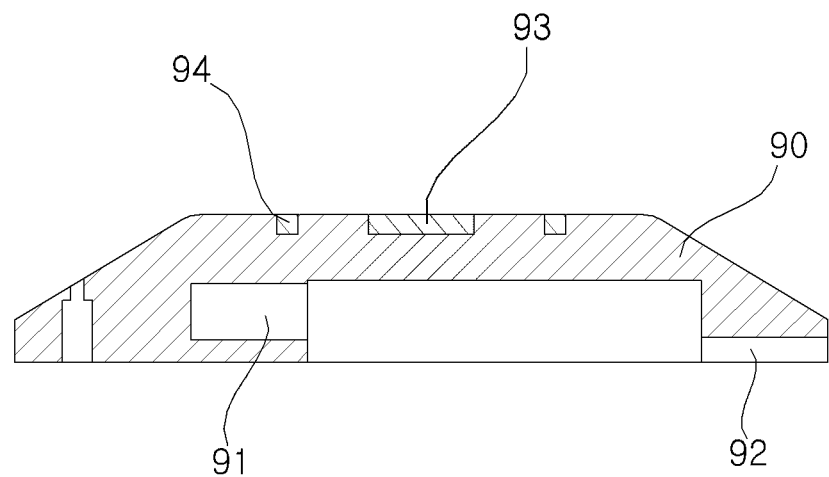
FIG. 10 is a cross-sectional view of the docking station of FIG. 9.

A power supply means for applying external power to the dryer stand according to an embodiment of the present disclosure is described below with reference to FIGS. 2, 9, and 10.

The dryer stand is placed on the docking station 90 in order to charge the battery 100. Referring to FIGS. 9 and 10, a recess 92 through which an electric wire connected to an external power source passes and a socket 91 into which a plug connected to one end of the electric wire is inserted may be formed at the bottom of the docking station 90. A first external terminal 93 may be positioned at the center of the top of the docking station as an electrode terminal. A second external terminal 94 having a ring shape may be inserted and positioned at the outskirts of the first external terminal 93 as an electrode terminal.

When the stand is mounted on the docking station 90, the top side of the docking station 90 protrudes upward through the hollow unit 12 of the base 10 and comes in contact with the bottom of the lower plate 31. A first internal terminal electrically connected to the first external terminal 93 may be positioned at the center of the lower plate 31. A second internal terminal 104 electrically connected to the second external terminal 94 may be positioned at the outskirts of the first internal terminal 103. The first internal and external terminals 103 and 93 that are electrically connected to each other are positioned at the center of the first lower plate 31 and the docking station 90. The second internal and external terminals 104 and 94 are formed in a ring shape. Accordingly, although the dryer stand and the docking station 90 are separately rotated, the terminals can maintain the state in which they are always electrically connected. That is, the dryer stand and the docking station 90 can be rotated with respect to one another while maintaining an electrical connection between the first internal terminal 103 and the first external terminal 93 and while maintaining an electrical connection between the second internal terminal 104 and the second external terminal 94.

Figure 6:
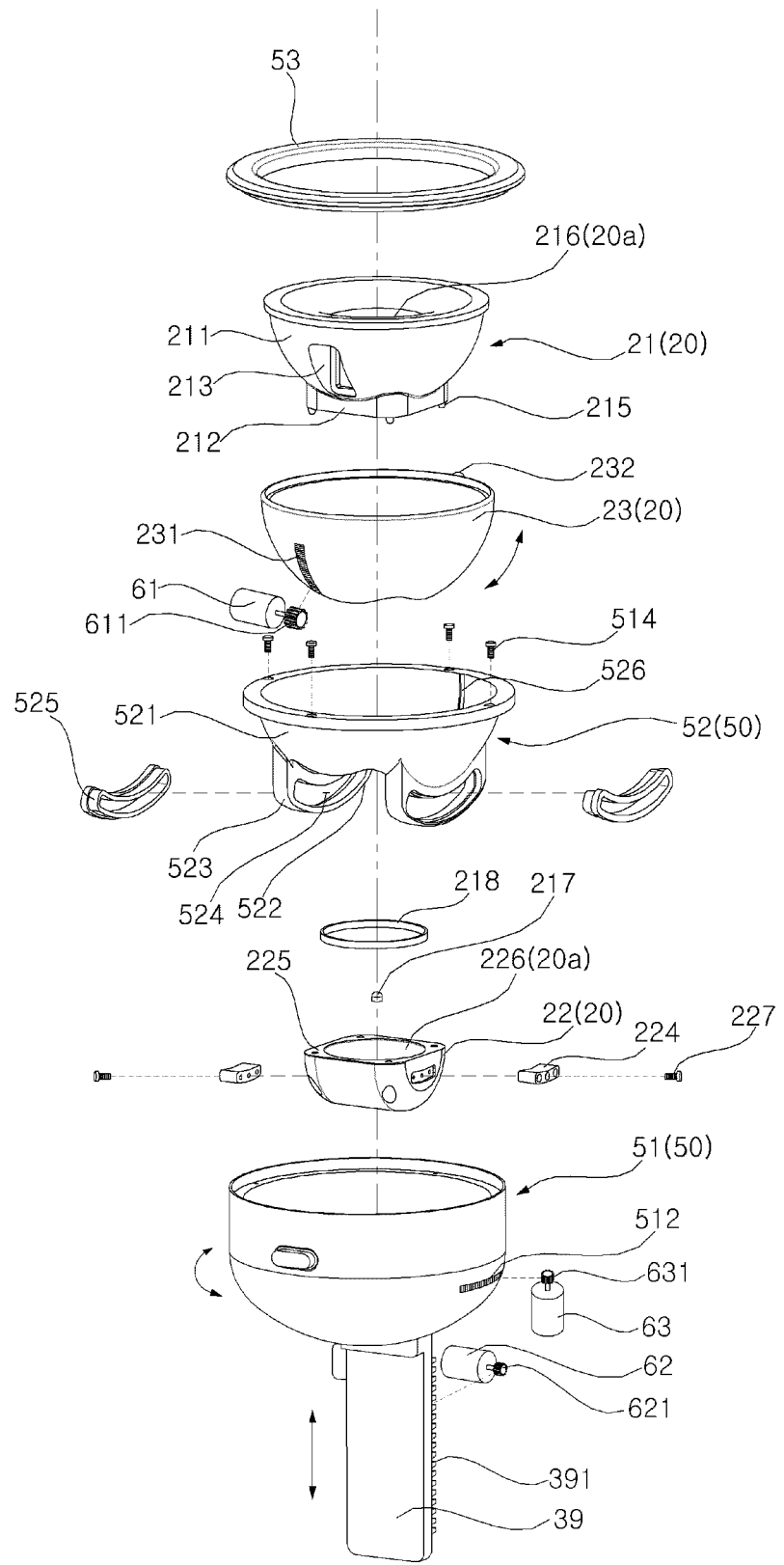
FIG. 6 is an exploded perspective view of the upper part of the dryer stand according to an embodiment of the present disclosure.

Furthermore, referring to FIGS. 2, 6 and 7, first and second contact terminals 217 and 218 that may be electrically connected to the first and second external terminals 93, 94 directly or that may be electrically connected to the battery 100 may be positioned within the receptacle 20.

If the grip 2 of the dryer is inserted into the receptacle 20, first and second target contact terminals 2a and 2b electrically connected to the first and second contact terminals 217 and 218 may be positioned in the grip. In the present disclosure, when the grip 2 is inserted into the groove 20a, the grip 2 is fixed to the groove 20a at a specific location by means of fixing means, such as a magnet M1, M2.

The first contact terminal 217 and the first target contact terminal 2a are positioned at the center of the bottom of the groove 20a of the receptacle or the center of the bottom of the grip 2 of the dryer. The second contact terminal 218 and the second target contact terminal 2b are formed in a ring shape. Although the grip 2 of the dryer and the receptacle 20 are relatively rotated, the contact terminals can always maintain an electrical connection state.

The first and second contact terminals 217 and 218 may be electrically connected the battery 100 and the first and second internal terminals 103 and 104, respectively, and a switchover switch may be positioned therebetween (e.g., the switchover switch may be positioned between the battery and the first and second internal terminals 103 and 104). The switchover switch may be of the type known to one of ordinary skill in the art for switching electrical connection between receptacles.

If the dryer 1 is mounted on the receptacle 20 and external power from the docking station 90 is applied to the first and second internal terminals 103 and 104, the controller 110 may control the switchover switch so that the first and second contact terminals 217 and 218 are directly connected to the first and second internal terminals 103 and 104 electrically and that the first and second contact terminals 217 and 218 and the battery 100 are electrically disconnected. Accordingly, the external power can be directly applied to the dryer without the intervention of the battery 100 (e.g., without power being applied to the dryer by the battery, the battery being electrically disconnected from the dryer, etc.).

If external power is not applied to the first and second internal terminals 103 and 104, the switchover switch may be reversely controlled so that the first and second contact terminals 207 and 208 and the battery 100 are electrically connected.

Likewise, if external power from the docking station 90 is applied to the first and second internal terminals 103 and 104, the controller 110 electrically connects the first and second internal terminals 103 and 104. Accordingly, the external power can be applied to the controller 110, the lighting device 70 and the air purifier 80 without the intervention of the battery 100. Furthermore, if external power is not applied to the first and second internal terminals 103 and 104, the battery 100 may be electrically connected to the controller 110, the lighting device 70 and the air purifier 80.

Referring to FIGS. 2 to 5, the battery 100 may be positioned in the hollow unit 35 formed on the lower side of the vertical plate 32. The controller 110 may be positioned between the battery 100 and the light-emitting module 82. In this case, the lower side means a portion beneath the center of the dryer stand in the up and down direction. The hollow unit 35 in which the battery 100 heavier than other elements is positioned is preferably positioned on the lower side by taking the center of mass into consideration.

In an embodiment of the present disclosure, the partition wall 34 is formed toward the back of the lower side of the vertical plate 32. Accordingly, the hollow unit 35 may be formed between the partition wall 34 and an approximately central part of the dryer stand in the up and down direction.

The controller 110 is positioned close to the battery 100, thereby reducing the length of a cable that connects the battery 100 and the controller 110. Furthermore, the controller 110 is positioned in parallel to the vertical plate 32, thereby being capable of minimizing flow resistance of air.

An action of the dryer stand and a method of controlling the dryer stand configured above according to embodiments of the present disclosure are described below.

Figure 11:
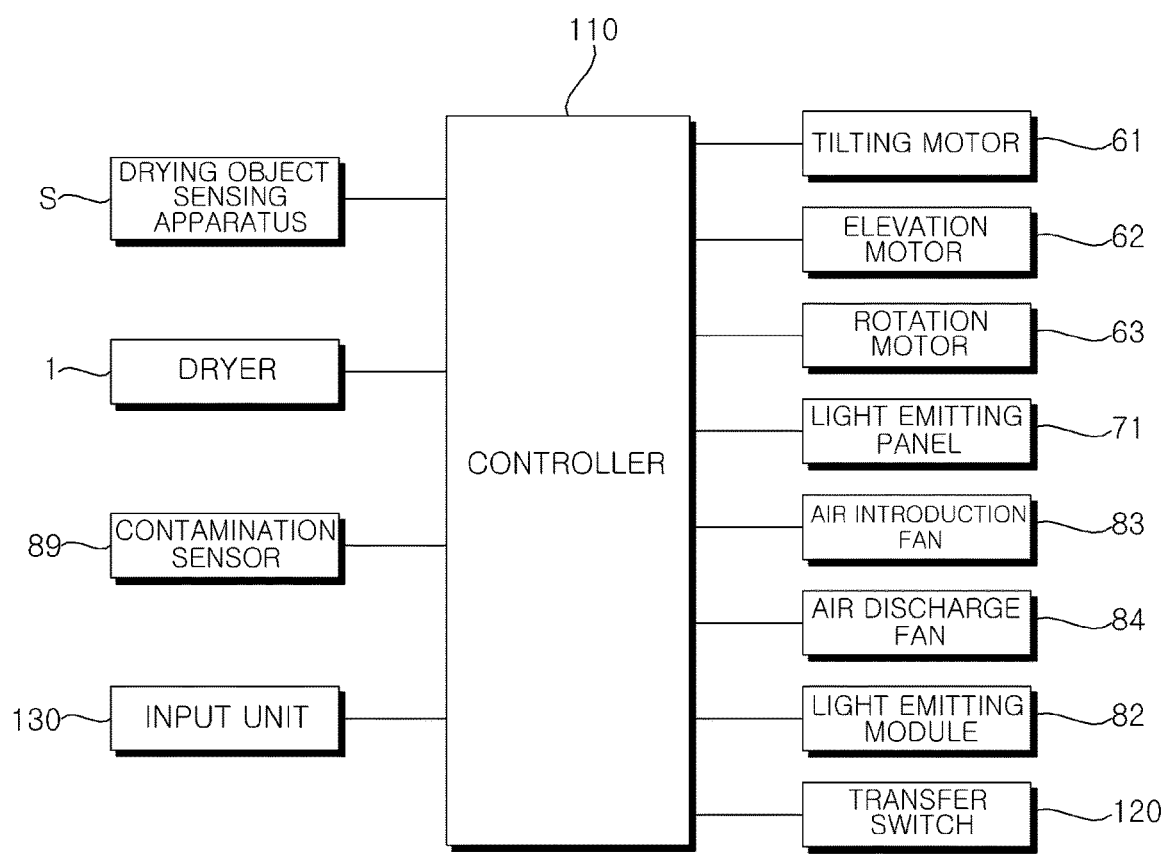
FIG. 11 is a block diagram showing the controller of the dryer stand according to an embodiment of the present disclosure.

Referring to FIG. 11, the controller 110 may receive information on an object that approaches the dryer stand from the target drying object detection device S, may receive information on whether the dryer operates from the dryer 1, may receive information on a pollution level of air from the pollution level sensor 89, and may receive a signal for the operation of the dryer and the dryer stand through an input unit from a user. The sensing apparatus S is positioned on the front surface of the supporter body 51 and may be moved along with a movement of the supporter body 51. In this case, the detection hole 402 is formed by taking into consideration a moving range and an angle of view of the sensing apparatus S. In an embodiment of the present disclosure, the sensing apparatus S is spaced apart from the supporter body 51 and may be fixed to a given location regardless of a movement of the supporter body 51. In this case, the detection hole 402 may be formed by taking into consideration the fixing location and an angle of view of the sensing apparatus S.

The input unit 130 may be a switch (e.g., 13, 14 in FIG. 9) provided in the dryer stand or a smartphone connected to the dryer stand through known communication means.

The controller 110 may control the operation of the dryer 1 and the dryer stand, including the dryer 1, the tilting motor 61, the elevation motor 62, the rotation motor 63, the light-emitting panel 71, the suction fan 83, the discharge fan 84, the light-emitting module 82, and the switchover switch 120 using the received information to signal.

The dryer stand according to an embodiment of the present disclosure may be controlled in an automatic mode, an interoperation mode, or a manual mode through the input unit 130 from a user. The automatic mode is a mode in which the lighting device 70 is controlled based on information on whether an object approaches, received from the target drying object detection device S. The interoperation mode is a mode in which the lighting device 70 is turned on when the dryer 1 operates and light therapy is performed when dry is performed. The manual mode is a mode determined by a user regarding whether to drive the lighting device.

Figure 12:
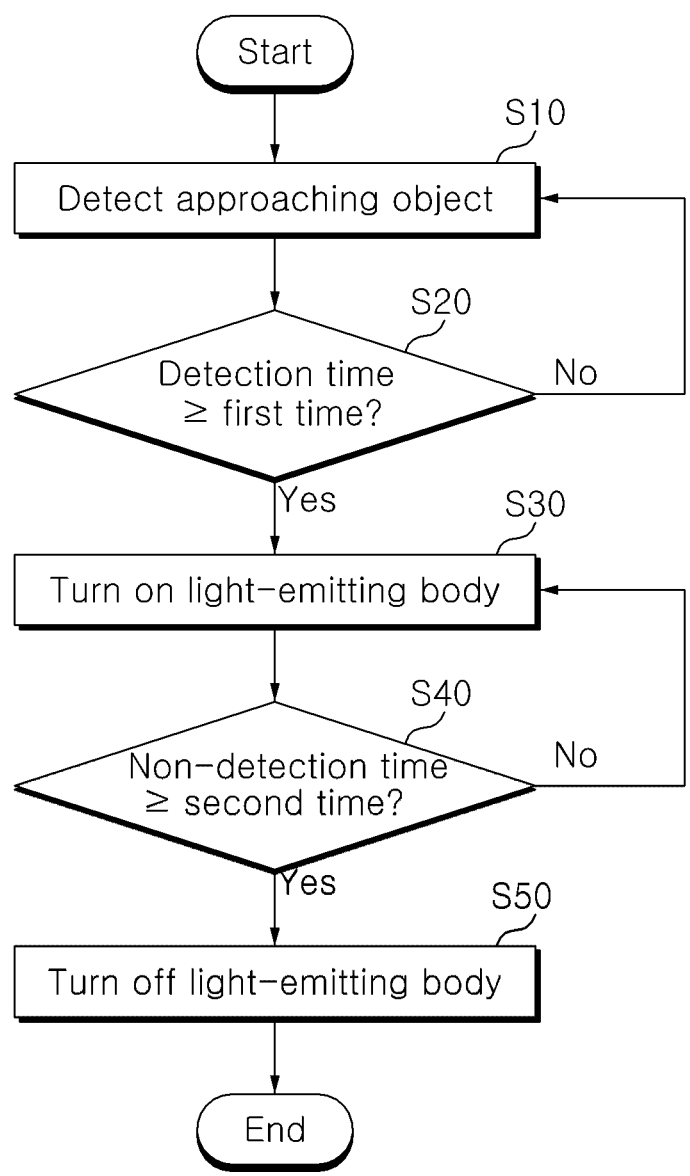
FIG. 12 is a flowchart illustrating a method of controlling the dryer stand according to an embodiment of the present disclosure.

A method of controlling the dryer stand according to a first embodiment of the present disclosure is described below with reference to FIG. 12.

The dryer stand according to a first embodiment of the present disclosure may perform the automatic mode. The dryer stand includes the target drying object detection device S for detecting an approaching object. The target drying object detection device S has been named in relation to the operation of the dryer 1, and detects an object that approaches the dryer stand although dry is not performed.

When the target drying object detection device S detects an approaching object within a given distance range from the dryer stand (S10), the controller 110 may reduce depression of the object by turning on the lighting device 70 (hereinafter also referred to as a "light-emitting body") (S30). The object may be a user, an infant or a pet.

The given distance may be the distance in which the target drying object detection device S can detect an approaching object or may be a distance set within a distance range in which the target drying object detection device S can detect an approaching object. The distance may be set by a designer when the dryer stand is produced, and a user may change a set value as desired. The same is applied to preset values, such as first and second times and the reference amount of remaining power.

A user does not use the dryer stand, but may simply pass by the dryer stand. In this case, to turn on the lighting device 70 results in power waste. In order to prevent such power waste, when the target drying object detection device S detects an approaching object (S10), the controller 110 may determine whether the time during which the object is detected is a preset first time or more (S20), and may turn on the lighting device 70 if the detecting time is the first time or more (S30).

If an object within a given distance range from the dryer stand is not detected after step S30, the lighting device 70 may be turned off. However, if a user stops near the dryer stand and gets light radiated from the lighting device 70, it is necessary to prevent the turn-off of the lighting device 70. Accordingly, if the target drying object detection device S does not detect an object within given distance range during a preset second time after step S30 (S40), the controller 110 may turn off the lighting device 70 (S50), and may maintain the turn-on of the lighting device 70 if the time during which an object is not detected is shorter than the second time.

The first time may be set as a short time in order to prevent unnecessary turn-on and make a rapid response. For example, the first time may be set based on the time taken for an adult to exit from the given distance range after entering the given distance range when the adult passes by the dryer stand. For example, the first time may be set within a range of 1 to 10 seconds by a designer or user.

The second time may be set longer than the first time in order to prevent power waste when the dryer stand is not used and to prevent the turn-off of the dryer stand when it is used. For example, the second time may be set within a range of 10 seconds to 1 minute by a designer or user.

Figure 13:
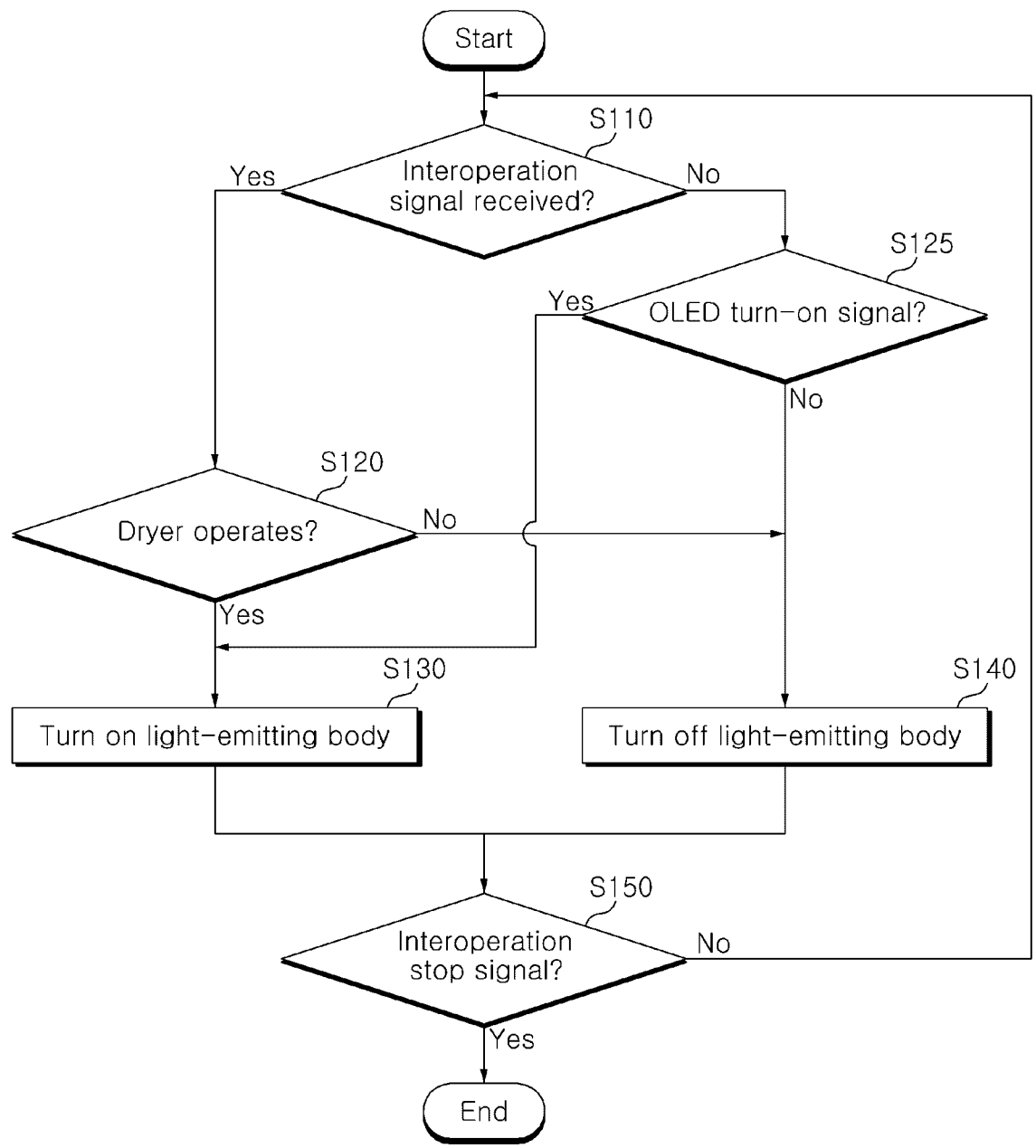
FIG. 13 is a flowchart illustrating a method of controlling the dryer stand according to another embodiment of the present disclosure.

A method of controlling the dryer stand according to a second embodiment of the present disclosure is described below with reference to FIG. 13.

The dryer stand according to a second embodiment of the present disclosure may perform the interoperation mode.

The interoperation mode may be set from the start of the dryer stand, and may enable the lighting device 70 to be turned on when a user drives the dryer 1.

If the interoperation mode is set, the controller 110 may receive an interoperation signal. If the interoperation mode is released, the controller 110 may determine that there is no interoperation signal (S110).

When an interoperation signal is received, the controller 110 may control whether to turn on the lighting device 70 (or light-emitting body) in association with the operation of the dryer 1. The controller 110 may receive an interoperation signal from the dryer 1 and determine whether to drive the dryer (S120). The controller 110 may turn on the lighting device 70 (S130) if the dryer 1 operates, and turns off the lighting device 70 if the dryer 1 does not operate (S140).

When an interoperation stop signal is received, the controller 110 releases the interoperation mode (S150).

If the interoperation mode is released an interoperation signal is determined to be not present (S110), the controller 110 may determine whether a turn-on signal for the lighting device 70 is present (S125). The controller 110 may turn on the lighting device if a turn-on signal for the lighting device 70 is present (S130), and turns off the lighting device if a turn-on signal for the lighting device 70 is not present (S140).

Figure 14:
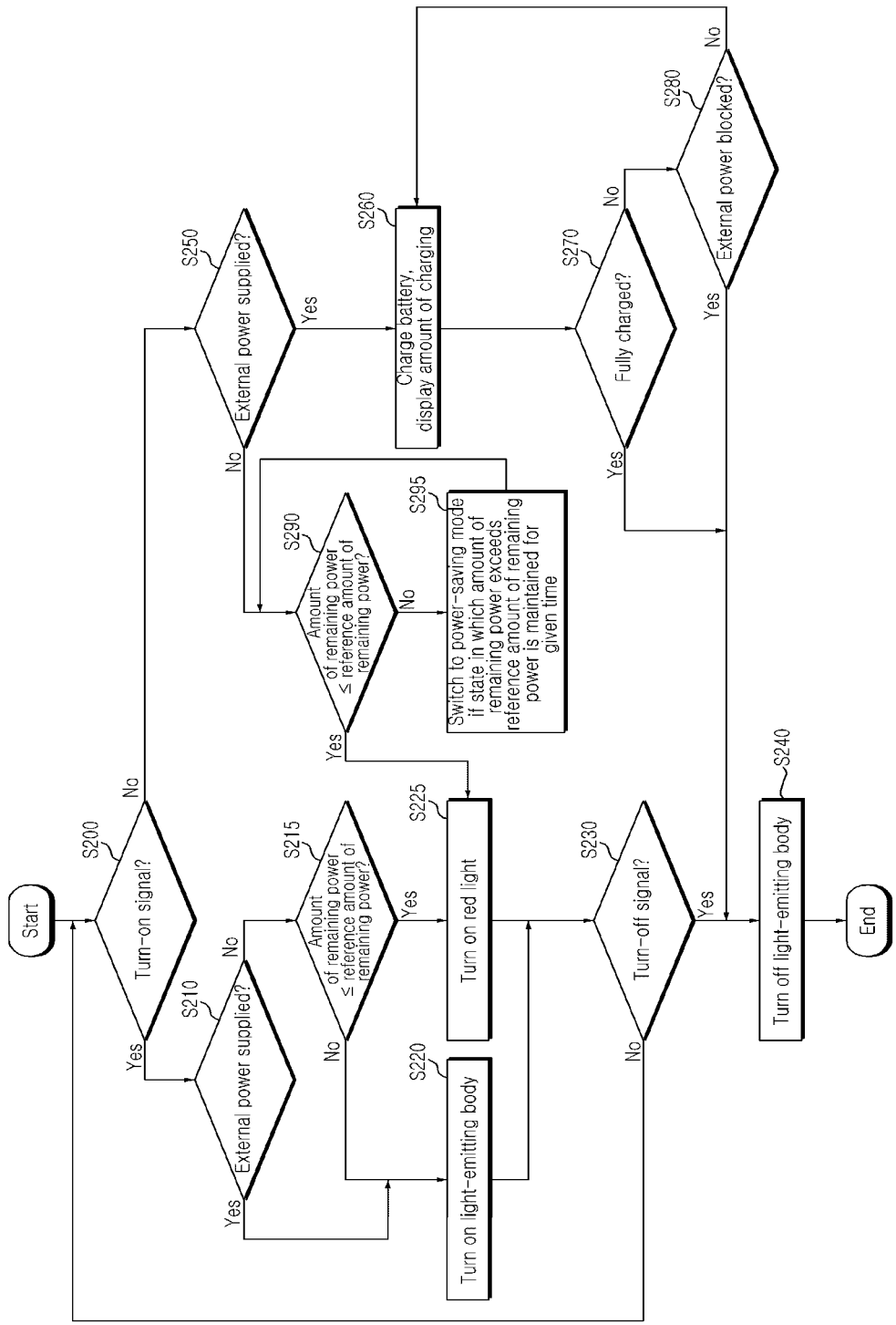
FIG. 14 is a flowchart illustrating a method of controlling the dryer stand according to another embodiment of the present disclosure.

A method of controlling the dryer stand according to a third embodiment of the present disclosure is described below with reference to FIG. 14.

The dryer stand according to the third embodiment of the present disclosure includes the base 10, the seating unit 20, 50, the side cover 40, the lighting device 70, the controller 110, and the battery 100 charged by external power. The battery 100 may apply power to the dryer 1 and the lighting device 70.

The controller 110 receives a turn-on signal when an object approaches in the automatic mode and when the dryer 1 operates in the interoperation mode. Furthermore, in the manual mode, the controller 110 receives a turn-on signal through the input unit 130 from a user (S200).

After the controller 110 determines whether a turn-on signal is received (S200), it determines whether external power is supplied to the dryer stand (S210, S250).

If a turn-on signal is received and external power is supplied to the dryer stand (S210), the controller 110 turns on the lighting device 70 (or light-emitting body) (S220).

If a turn-on signal is received and external power is not supplied to the dryer stand (S210), the controller 110 compares the amount of remaining power (hereinafter also referred to as a "charging ratio") with a preset reference amount of remaining power (S215). If the amount of remaining power exceeds the reference amount of remaining power, the controller 110 may turn on the light-emitting body (S220). If the amount of remaining power is the reference amount of remaining power or less, the controller 110 may notify a user that the amount of remaining power of the battery 100 is the reference amount of remaining power or less by displaying that the amount of remaining power of the battery 100 is the reference amount of remaining power or less through the lighting device 70 (S225). Step S225 may include turning on a red light of the light-emitting body to indicate the amount of remaining power of the battery 100 is the reference amount of remaining power or less.

If the supply of external power is stopped, the controller 110 may notify a user that the amount of power of the battery 100 is not sufficient to drive the lighting device 70 of the dryer stand, the air purifier 80 or the dryer 1 so that the dryer stand is supplied with external power because the dryer stand is supplied power from the battery 100.

If the supply of external power is stopped and the amount of remaining power of the battery 100 is the preset reference amount of remaining power or less, the controller 110 may notify a user that the amount of remaining power of the battery 100 is the reference amount of remaining power or less through the lighting device 70.

A plurality of LEDs and/or OLEDs for radiating light having different wavelengths may be mounted on the lighting device 70. Accordingly, the lighting device may radiate light of a different color according to circumstances.

If the supply of external power is stopped (No in S210) and the amount of remaining power of the battery 100 is the reference amount of remaining power or less (S215), the controller 110 may notify a user that the amount of remaining power of the battery 100 is the reference amount of remaining power or less by turning on light having a color different from the color of white light having a spectrum similar to that of natural light of the lighting device 70 (S225). The different color may be red light, for example.

The reference amount of remaining power may be the amount of power that is not sufficient to drive the lighting device 70, air purifier 80 or dryer 1 of the dryer stand, and may be the amount of power, which may charge the battery embedded in the dryer 1 once, for example. Alternatively, the reference amount of remaining power may be the amount of power, which may turn on the light-emitting panel 71 during the time for which the dryer 1 can perform dry using the battery of the dryer 1. Alternatively, the reference amount of remaining power may be set based on the total amount of the battery 100 or may be the amount of power equivalent to about 10% of the capacity of the battery 100.

After step S220 or S225, when a turn-off signal is received (S230), the controller 110 turns off the light-emitting body (S240).

If a turn-on signal is not received (No in S200), the controller 110 determines whether external power is supplied (S250). If external power is determined to be supplied, the controller 110 charges the battery 100 using the external power and displays the charging ratio of the battery 100 through the lighting device 70 (S260).

The controller 110 may display the amount of charging of the battery 100 by turning on only some of the entire area of the light-emitting panel 71. For example, the controller 110 may display a degree that the battery 100 is charged by turning on an area that belongs to the entire area of the light-emitting panel 71 and that has the same ratio as the charging ratio (or the amount of remaining power) of the battery 100, and may turn on up to an area of a ratio corresponding to a charging ratio on one side of the light-emitting panel 71 so that a user can check the amount of remaining power of the battery 100 at a look.

For example, if the charging ratio of the battery 100 is 70%, the controller 110 may notify a user that the charging ratio of the battery 100 is 70% by turning on up to an area corresponding to 70% of a total height from the leftmost side of the light-emitting panel 71.

Alternatively, the controller 110 may display the turn-on area of the light-emitting panel 71 using a numerical value, so the charging ratio of the battery may be displayed.

Alternatively, the controller 110 may display a degree that the battery 100 is charged using light having various colors. For example, the controller 110 may turn on red light if the charging ratio of the battery 100 is the reference amount of remaining power, may turn on yellow light within a range of a given charging ratio or less (e.g., 80% of the total amount of power of the battery), which exceeds the reference amount of remaining power and is a fully charged state or less, and may turn on green light if the charging ratio of the battery 100 exceeds the given charging ratio.

The controller 110 turns off the light-emitting body (S240) if the battery 100 is fully charged, and determines whether the external power has been blocked (S280) if the battery 100 is not fully charged (S270).

The controller 110 turns off the light-emitting body (S240) if the battery 100 is not fully charged and the external power is blocked, and maintains the display of the amount of charging (S260) through a battery charging and lighting device if the battery 100 is not fully charged and the external power is not blocked (S280).

If a turn-on signal is not received (No in S200), the controller 110 determines whether the external power is supplied (S250). If it is determined that external power is not supplied, the controller 110 determines whether the amount of remaining power of the battery 100 is the reference amount of remaining power or less (S290).

If the amount of remaining power of the battery 100 is the reference amount of remaining power or less, the controller 110 performs step S225.

If the amount of remaining power of the battery 100 exceeds the reference amount of remaining power, the controller 110 switches the mode of the dryer stand to a power saving mode in order to prevent an unnecessary power loss (S295).

The controller 110 may maintain a power saving mode release signal reception waiting state in the power saving mode, and may not receive other signals.

Only one of the control methods according to the first to third embodiments are not applied to the dryer stand according to an embodiment of the present disclosure, but one or more of the control methods may be applied to the dryer stand.

The above-described numerical ranges of the distance, time, and amount of remaining power are merely examples, and should not be construed as being numerical ranges that limit the present disclosure.

The dryer stand of the present disclosure has one or more of the following effects.

First, there are advantages in that an object to be dried can be dried even without holding the dryer and a fatigue of a user can be reduced although a dry time is long because the seating unit on which the dryer is mounted is provided.

Second, there are advantages in that light therapy can be performed while the dryer operates or separately from the operation of the dryer and a seasonal depression attributable to insufficient going-out (e.g., insufficient exposure to light) can be reduced because the seating unit in which the dryer is set and the lighting device are provided.

Third, there is an advantage in that an infant or a pet can be induced to approach the dryer stand with curiosity and can be prevented from avoiding dry using the dryer by turning its attention to the lighting device because the lighting device is positioned on the air discharge direction side of the dryer Fourth, there is an advantage in that dazzling can be prevented because the front cover forming an appearance of the side in the direction to which air is discharged is made of a transparent or semi-transparent material, the front cover has an arc-shaped section and includes the OLED panel forming a surface light source, and light radiated from the lighting device is radiated to a wide area.

Fifth, there are advantages in that a user can check the state of the battery at a look (e.g., a glance) because the controller displays the degree of charging of the battery through the lighting device while the battery is charged and notifies the user 33391 the amount of remaining power of the battery is insufficient through the lighting device if the supply of external power is stopped and the amount of remaining power of the battery is insufficient.

Effects of the present disclosure are not limited to the above-described effects, and other effects not described above may be evidently understood by those skilled in the art from the claims.

Furthermore, although preferred embodiments have been illustrated and described above, this specification is not limited to the above-described specific embodiments, and a person having ordinary skill in the art to which this specification pertains may modify the present disclosure in various ways without departing from the gist of the present disclosure in the claims. Such modified embodiments should not be individually understood from the technical spirit or prospect of this specification.

What is claimed is:

1. A dryer stand, comprising:
    a seat to receive a dryer thereon;
    a base spaced apart from the seat in a vertical direction;
    a side cover positioned between the base and the seat;
    a light positioned in an internal space defined by the side cover; and
    a stem supporting the seat, the stem comprising a lower plate positioned above the base and a vertical plate extending from the lower plate,
    wherein the light is positioned to overlap the vertical plate in the front direction.

2. The dryer stand of claim 1, wherein the side cover comprises a front cover facing a front direction in which the dryer discharges air, and
    wherein the front cover is made of a transparent or semi-transparent material.

3. The dryer stand of claim 2, wherein the front cover has an arc-shaped section.

4. The dryer stand of claim 1, wherein the dryer has an air outlet formed toward a front direction of the dryer.

5. The dryer stand of claim 4, wherein the vertical plate includes a front surface having a concave part depressed in a rearward direction, the concave part of the vertical plate having a shape corresponding to a shape of the light, and
    wherein the light is inserted into the concave part of the vertical plate.

6. The dryer stand of claim 1, further comprising a reflection plate disposed on the lower plate,
    wherein the reflection plate has a convex shape extending in the vertical direction.

7. The dryer stand of claim 1, wherein the light comprises an organic light emitting diode (OLED) panel.

8. The dryer stand of claim 7, wherein the side cover comprises a front cover facing a front direction in which the dryer discharges the air,
    wherein the front cover has an arc-shaped section and is made of a transparent or semi-transparent material, and
    wherein the OLED panel has an arc-shaped section and is positioned to face an inner side of the front cover.

9. A dryer stand, comprising:
    a seat to receive a dryer thereon;
    a base spaced apart from the seat in a vertical direction;
    a side cover positioned between the base and the seat;
    a light positioned in an internal space defined by the side cover;
    a controller configured to turn on and to turn off the light; and
    a target drying object detection device for detecting an object,
    wherein the controller is further configured to turn on the light when the target drying object detection device detects an object within a predetermined distance range.

10. The dryer stand of claim 9, wherein the controller is further configured to turn on the light when the target drying object detection device detects an object within the predetermined distance range and within a preset first time or more.

11. The dryer stand of claim 10, wherein the controller is further configured to turn off the light when the target drying object detection device does not detect an object within the predetermined distance range during a second time or more while the light is turned on, and
    wherein the second time is longer than the first time.

12. The dryer stand of claim 9, wherein the controller is further configured to turn on the light when the dryer is operated and to turn off the light when the dryer is not operated.

13. A dryer stand, comprising:
    a seat to receive a dryer thereon;
    a base spaced apart from the seat in a vertical direction;
    a side cover positioned between the base and the seat;
    a light positioned in an internal space defined by the side cover;
    a controller configured to turn on and to turn off the light; and
    a battery charged by external power, the battery applying power to the dryer and to the light.

14. The dryer stand of claim 13, wherein the controller is further configured to display a remaining power of the battery through the light when the battery is charging.

15. The dryer stand of claim 14, wherein the controller is further configured to turn off the light when the battery is fully charged.

16. The dryer stand of claim 13, wherein the light comprises a light-emitting panel,
    wherein the controller is further configured to turn on a first area among a total area of the light-emitting panel, and
    wherein a ratio of the first area to the total area of the light emitting panel corresponds to a ratio of a remaining power of the battery.

17. The dryer stand of claim 13, wherein the light comprises a light-emitting panel, and
    wherein the controller is further configured to turn on a first area of the light-emitting panel corresponding to a ratio of a remaining power of the battery from a lowest side of the light-emitting panel.

18. The dryer stand of claim 13, wherein the controller is further configured to, when a supply of external power to the battery is stopped and an amount of remaining power of the battery is a preset reference amount of remaining power or less, indicate the amount of remaining power of the battery is the preset reference amount of remaining power or less through the light.

* * * * *